United States Patent [19]

Furuta et al.

[11] Patent Number: 4,485,413

[45] Date of Patent: Nov. 27, 1984

[54] PROCESS AND APPARATUS FOR CONVERTING A VIDEO FRAME INTO A SET OF COLOR SEPARATION FILMS

[75] Inventors: Haruo Furuta, Tokyo; Toshiji Fujita, Niiza; Chihiko Yamada, Tokyo; Masaki Nojima, Urawa, all of Japan

[73] Assignee: Toppan Printing Company, Ltd., Japan

[21] Appl. No.: 303,558

[22] Filed: Sep. 23, 1981

Related U.S. Application Data

[63] Continuation of Ser. No. 97,413, Nov. 26, 1979, abandoned.

[30] Foreign Application Priority Data

| Nov. 30, 1978 | [JP] | Japan | 53-148205 |
| Mar. 3, 1979 | [JP] | Japan | 54-24264 |
| Apr. 24, 1979 | [JP] | Japan | 54-168295 |
| Jun. 1, 1979 | [JP] | Japan | 54-83750 |
| Jul. 2, 1979 | [JP] | Japan | 54-97685 |
| Jul. 31, 1979 | [JP] | Japan | 54-98345 |

[51] Int. Cl.³ .................................... H04N 9/495
[52] U.S. Cl. ........................... 358/334; 358/78; 358/77
[58] Field of Search ............... 358/310, 311, 313, 332, 358/345, 75–80, 285, 287; 360/9.1, 10.1, 11.1, 13, 14.2, 27, 72.2

[56] References Cited

U.S. PATENT DOCUMENTS

| 3,230,303 | 1/1966 | Nacouski et al. | 358/77 |
| 3,349,269 | 10/1967 | Hamann . | |
| 3,519,347 | 7/1970 | Bowker et al. | 358/76 X |
| 3,588,322 | 6/1971 | Bartel et al. | 358/78 |
| 3,617,626 | 11/1971 | Bluth et al. . | |
| 3,752,906 | 8/1973 | Lowry | 358/332 |
| 3,878,559 | 4/1975 | Pugsley | 358/78 X |
| 4,065,794 | 12/1977 | Shutterly | 360/9 X |
| 4,120,006 | 10/1978 | Nagami et al. . | |
| 4,127,870 | 11/1978 | Colditz | 358/77 |
| 4,167,759 | 9/1979 | Tachi | 360/14.3 |
| 4,193,092 | 3/1980 | Stoffel | 358/133 X |

FOREIGN PATENT DOCUMENTS

1482752 8/1977 United Kingdom .................... 358/6

OTHER PUBLICATIONS

Video Tape Recorders, Kybett; Sams & Co., Inc., ©1974, p. 97.
"An Automatic Editing System . . . ", Tanimura et al., SMPTE, Oct. 75, vol. 84, No. 10, pp. 781–789.
"Automated Video Tape Editing System", Shimada et al., Toshiba Review, Oct. 1971, No. 16.
"Method for Producing Photographic Color Prints from Video Tape Recorders", Anon, Research Disclosure, No. 131, p. 42, Mar. 75.
"A Versatile System for the Automation of Video Tape Editing", Daires, Journal of the SMPTE, vol. 79, Mar. 1970, pp. 197–202.
"Applying the SMPTE Time & Control Code to Television Audio Post Production", Swetland, SMPTE Journal, Aug. 78, vol. 87, pp. 508–512.

*Primary Examiner*—Aristotelis M. Psitos
*Attorney, Agent, or Firm*—Bacon & Thomas

[57] ABSTRACT

A color television video signal is directly read out in synchronism to the scanning speed of a scanner, the video signal thus read out is converted into three primary color signals, and these three primary color signals are in turn converted into process video signals, which are supplied to the scanner. A printing plate can be produced directly from a television video signal without requiring any color picture original.

20 Claims, 33 Drawing Figures

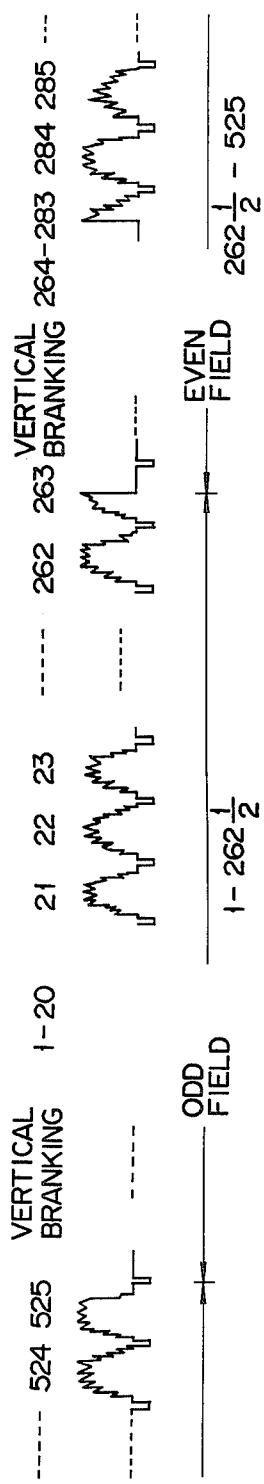
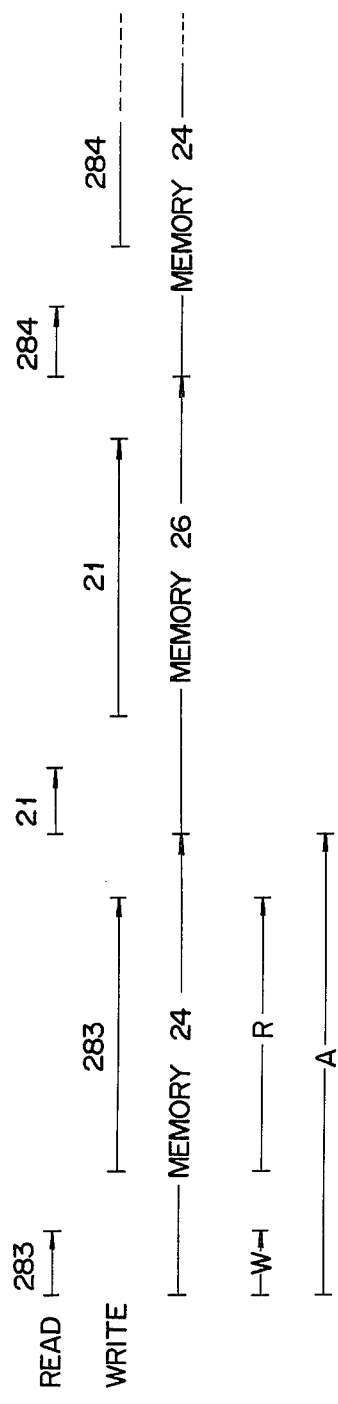
FIG. 3
FIG. 5

FIG. 13
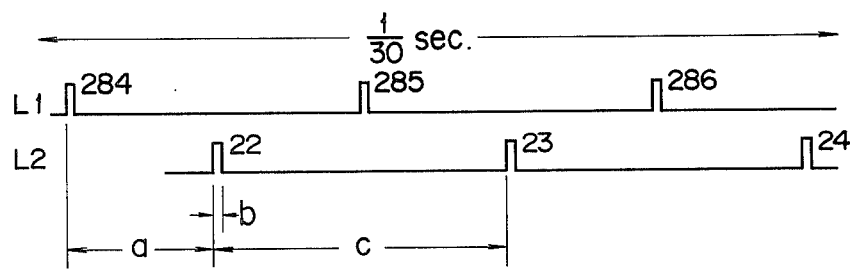
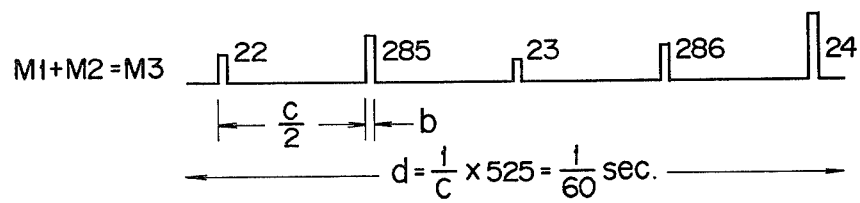
FIG. 16
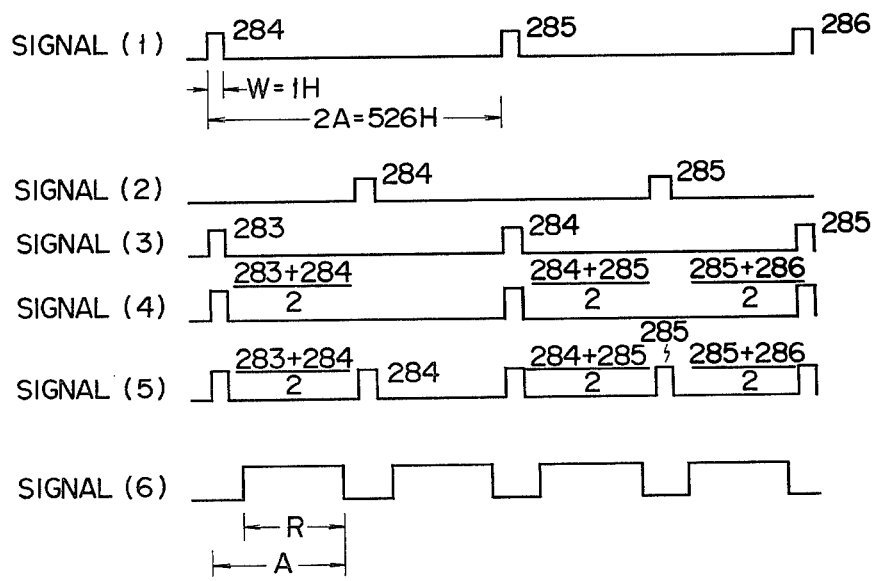

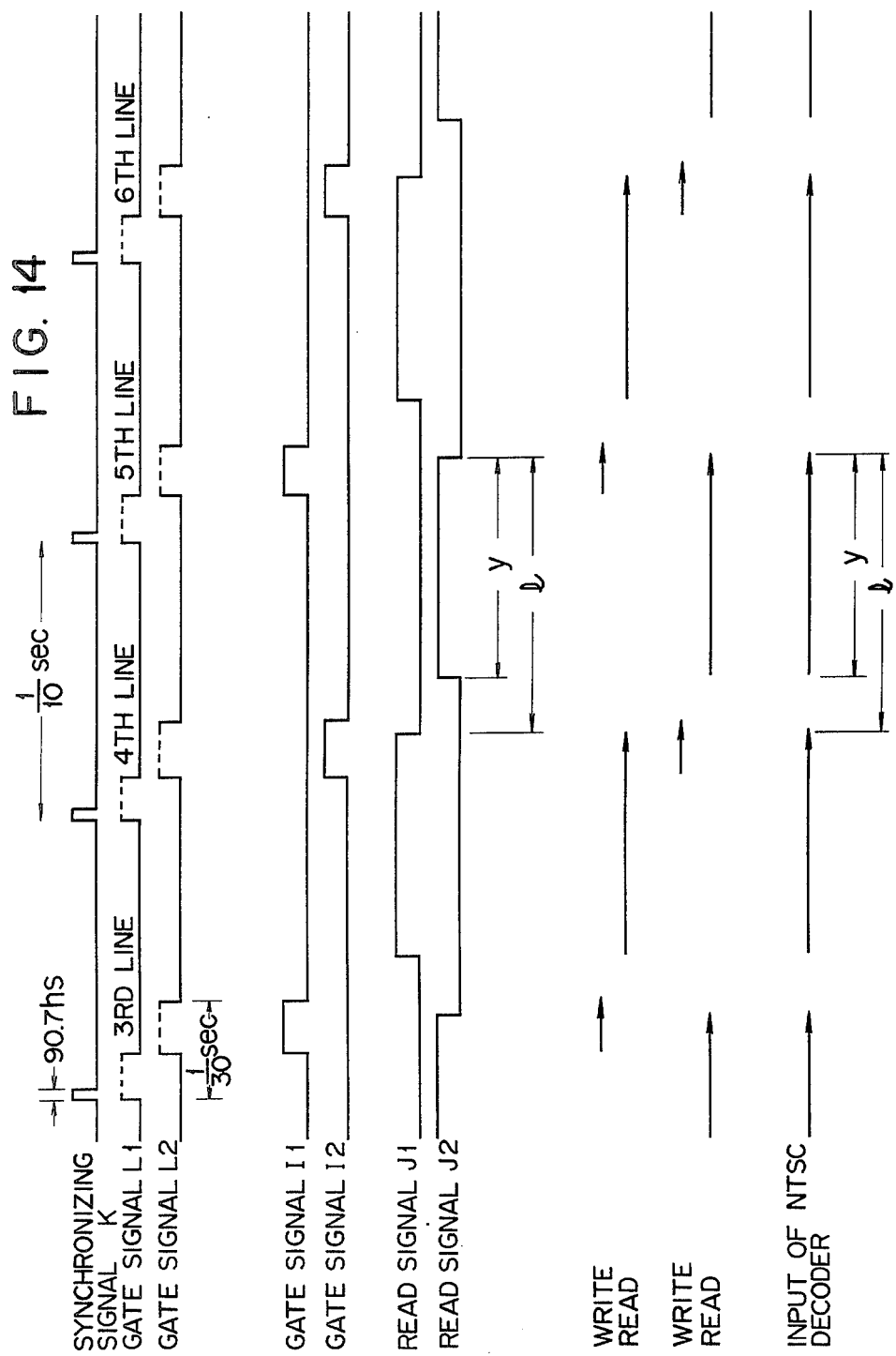

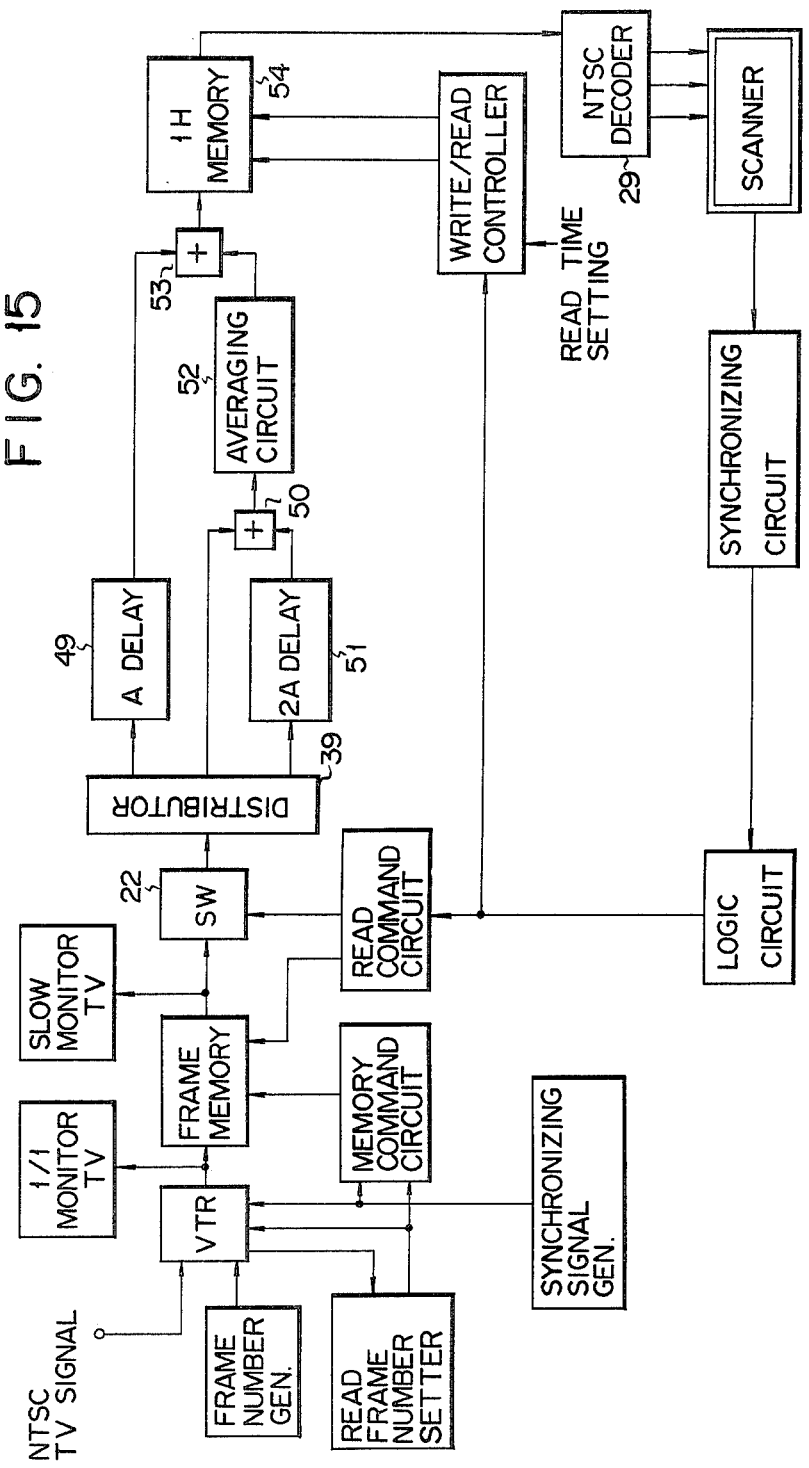
F I G. 15

PROCESS AND APPARATUS FOR CONVERTING A VIDEO FRAME INTO A SET OF COLOR SEPARATION FILMS

This application is a continuation, of application Ser. No. 97,413, filed Nov. 26, 1979 and now abandoned.

BACKGROUND OF THE INVENTION

This invention relates to a process apparatus for television picture, and more particularly, to color television picture.

With a recent increase in the type of television programs there has been a demand for apparatus for duplicating desired television picture on a mass production basis by photographing them or recording them by means of printing. Hitherto, for duplicating a television picture on a mass production basis it has been in practice to photograph the television picture with, for instance, a still camera for obtaining a color photograph, produce a printing plate from the color photograph with a process machine and duplicate the television picture with this printing plate on a mass production basis. However, the television picture reproduced on the color picture tube usually has color temperatures of about 9,000° K., and it is result of glowing of three different fluorescence, namely red (R), green (G) and blue (B) fluorescence. Therefore, its spectral energy distribution does not coincide with the spectral sensitivity distribution of the sensitive emulsion, so that a color photograph which is obtained by merely converting into colors the color temperatures of the television picture reproduced on the picture tube through color photographing is unsatisfactory in quality though might be seen well to the eye. Also, the television picture is formed by 525 scanning lines irrespective of its size, and its resolution is inferior among generally handled images. Further, since the printing plate is produced after the television picture is photographed by color photography, the print of the television picture is considerably deteriorated in resolution, color tone, gradation, etc.

SUMMARY OF THE INVENTION

An object of the invention is to provide a process apparatus for color television picture, which does not deteriorate the resolution, color tone, gradation, etc. of the television picture.

According to the invention, a process apparatus for color television picture which comprises: a video tape recorder from which a video signal corresponding to a desired television picture is read out, means for converting the read-out video signal into three primary color signals, means for converting the three primary color signals thus obtained into printing image signals and a scanner supplied with the printing image signal.

Another object of the invention is to provide a process apparatus for color television picture which comprises a video tape recorder from which a video signal corresponding to a desired frame of television picture is read out, means for inserting intermediate horizontal lines between adjacent horizontal scanning lines to increase the number of lines, means for converting the resultant signal into three primary color signals and an electronic process device such as an electronic color scanner supplied with these three primary color signals for producing three primary color printing plates.

A still another object of the invention is to provide a process apparatus for color television picture, in which the reading of video signal is controlled in synchronism to the rotation of the color scanner so as to permit use of a commercially available scanner.

A further object of the invention is to provide a process apparatus which eliminates requirements for the correspondence relation between the horizontal scanning lines of the television picture and the scanning lines in the color scanner and thus permit the video signal of the television picture to be handled confirmity to the rotation of the commercially available scanner by adopting a right angle relation between the horizontal scanning lines of the television picture and the direction of the exposure scanning lines in the color scanner.

A still further object of the invention is a process apparatus which can compensate the deterioration of the quality of the print image which may be the case with the conventional field images by producing from one field image another field image through average value interpolation.

A still further object of the invention is to provide a process apparatus which permits accurately selecting the specified frame from the video picture recorded on a video tape.

A still further object of the invention is to provide a process apparatus including means for eliminating the horizontal scanning lines of the television picture recognizable in films obtained by exposure in the color scanner.

A still further object of the invention is to provide a method of specifying a television picture frame with high accuracy.

A still further object is to provide a process apparatus for preparing television picture printing plates, with which a color film is newly produced together with Y, M, C and BK plates for printing directly from the television signal.

BRIEF DESCRIPTION OF THE DRAWING

FIG. 3 shows a waveform of a video signal;

FIG. 5 shows a timechart of writing in and reading out of a memory;

FIG. 13 shows timecharts of gate signals;

FIG. 14 shows timecharts of individual signals of the process apparatus of FIG. 10;

FIG. 15 shows a block diagram of a process apparatus wherein a signal approximating the video signal of one field is used, according to another embodiment;

FIG. 16 shows time charts of signals on the process apparatus of FIG. 15;

DETAILED DESCRIPTION OF THE PREFERRED EMBODIMENT

Now, an embodiment of the invention will be described with reference to FIG. 1.

Figure 1:
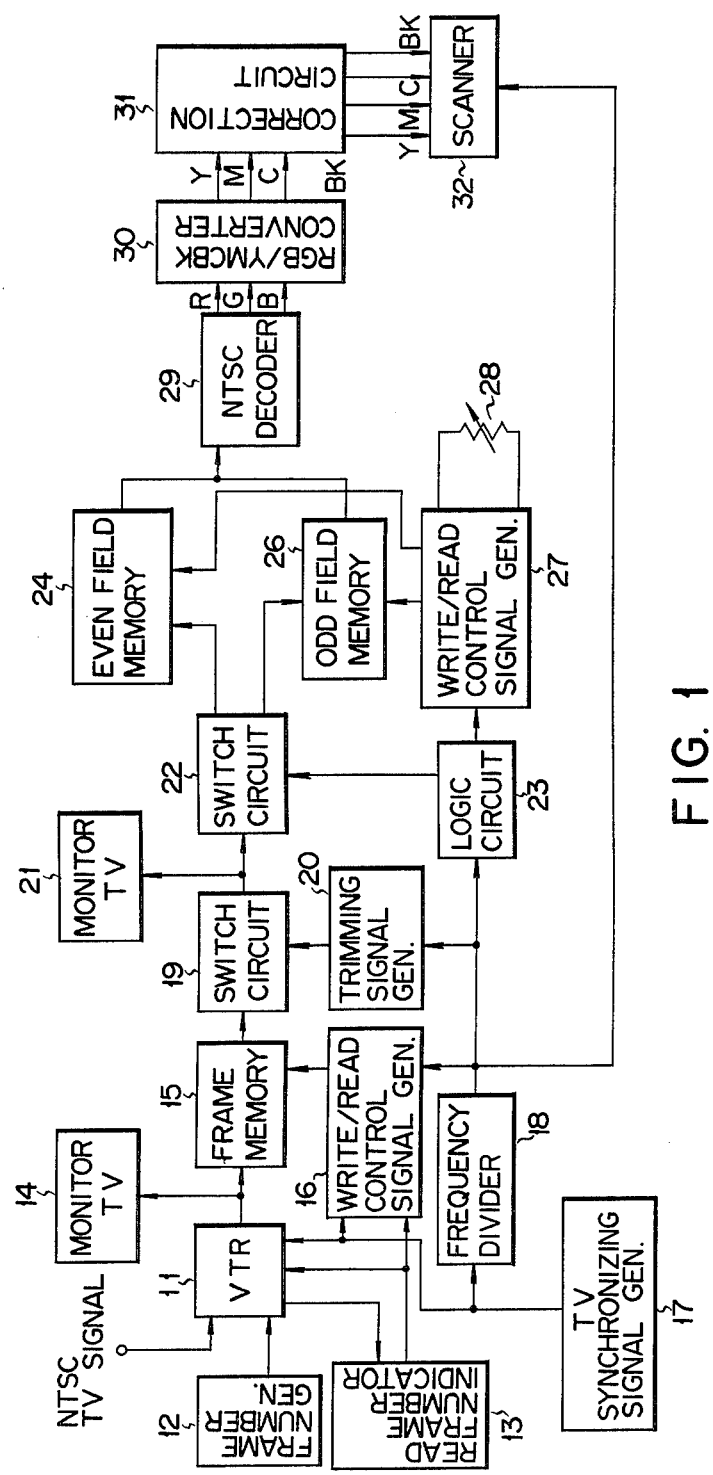
FIG. 1 shows a circuit diagram of a process apparatus according to an embodiment of the invention.

FIG. 1 shows the circuit of a process apparatus embodying the invention. In the Figure, an NTSC television signal is supplied to a video tape recorder 11. As the video tape recorder 1-inch or 2-inch type video tape recorder for business purpose is used. For selecting a frame as the original for making process plates the video tape recorder is preferably capable of slow playback and still playback. A frame number generator 12 and a read-out frame number indicator 13 are connected to the video tape recorder 11 (hereinafter referred to as VTR). The playback output side of the VTR 11 is connected to a monitor television set 14 and a frame memory 15. The frame memory 15 is adapted such that a signal of a frame is written in and read out of it in response to a write or read control signal from a write/read control signal generator 16. The write/read control signal generator 16 produces a write control signal in synchronism to a synchronizing signal from a television synchronizing signal generator 17 and produces a read control signal in synchronism to a frequency division output signal of a frequency divider 18 which divides the synchronizing signal from the synchronizing signal generator 17 by n (n being an integer). The read-out output of the frame memory 15 is coupled to a switch circuit 19. The switch circuit 19 is controlled by a trimming signal produced from a trimming signal generator 20 in synchronism to the frequency division signal from the frequency divider 18. In the switch circuit 19, the television picture is trimmed in a desired manner, and a video signal corresponding to the trimmed picture is produced from the switch circuit 19. The output of the switch circuit 19 is coupled to a monitor television set 21 and also to a switch circuit 22. The switch circuit 22 switches the odd and even field signals of one frame coupled to it through the switch circuit 19 in response to a control signal from a logic circuit 23. The switch circuit 22 has an even field output terminal connected to an even field 1H memory 24 and an odd field output terminal connected to an odd field 1H memory 26. The writing in and reading out of the memories 24 and 26 are effected in response to control signals from a write/read control signal generator 27. The write/read control signal generator 27 produces control signals in response to the output of the logic circuit 23, and the timing of reading is adjustable by a reading period setter 28. The outputs of the memories 24 and 26 are coupled to an NTSC decoder 29, which has a function of converting the field signals read out from the memories 24 and 26 into three primary color signals, that is, R (red), G (green) and B (blue) signals. The output of the NTSC decoder is coupled to a converter 30, which converts the R, G and B signals into printing signals, that is, Y (yellow), M (magenta), C (cyan) and BK (black) signals. The output of the converter 30 is coupled through a correction circuit 31 to a color scanner 32. The color scanner 32 is operated in synchronism to the frequency division signal from the frequency divider 18.

Figure 2:
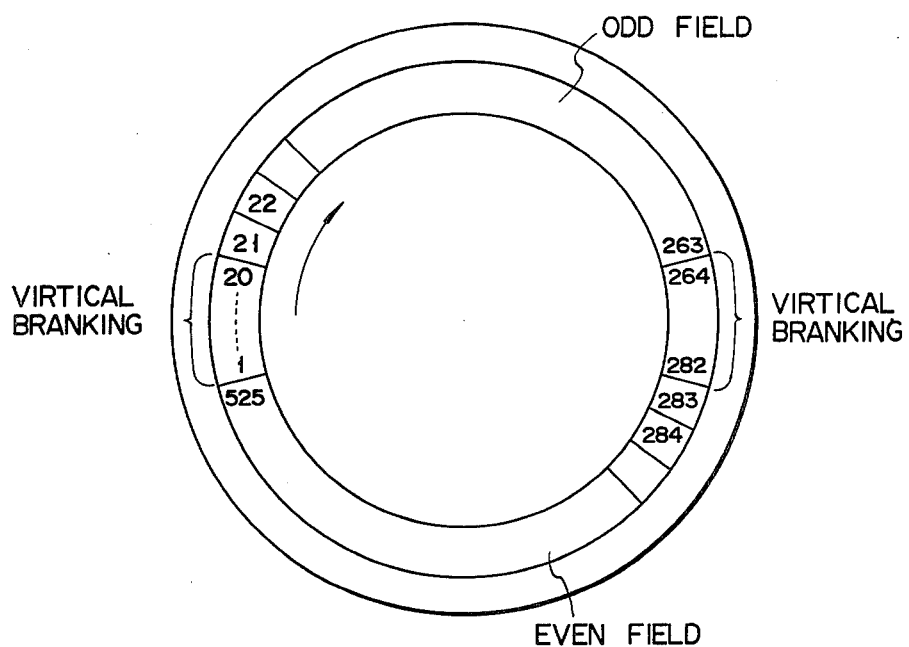
FIG. 2 shows a magnetic disc memory used in the process apparatus.
Figure 4:
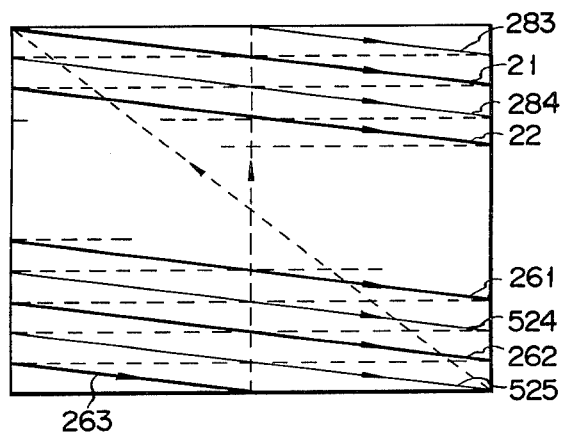
FIG. 4 shows scanning lines of a television picture.

The operation of the apparatus for preparing television picture printing plates according to the invention will now be described in connection with the circuit of FIG. 1. An NTSC television signal is supplied to the VTR 11 and recorded therein. At this time, frame number information for each frame, coupled from the frame number generator 12, is also recorded. It is possible to record this frame number information in an audio track which is not in use for any other purpose as well. When reading out a desired frame from the VTR 11 in which television signals are recorded, the number of the desired frame is set by the frame number indicator 13, and the VTR 11 is rendered into a playback state. The reproduced signal from the VTR 11 is supplied to the monitor television set 14 for playback of it thereon. At the time of this playback, the frame number information is read out from the VTR 11 and compared with the preset frame number information. When a frame video signal corresponding to the preset frame information is read out, the write/read control signal generator 16 supplies a write control signal as writing command to the frame memory 15. As a result, the frame video signal of the preset frame number is written in the frame memory 15. The frame memory 15 may be an analog type magnetic disc memory or a digital type solid state memory, and in the instant embodiment a magnetic disc memory is used. In this magnetic disc memory, the video signal is memorized in a manner as shown in FIG. 2. One television picture frame includes 525 horizontal scanning lines constituting an odd field and an even field. One picture frame also includes vertical branking periods corresponding to lines 1 to 20 and 264 to 283, with horizontal synchronizing signals (not shown) provided between adjacent lines (FIG. 3). As shown in FIGS. 2 and 4, the odd field includes lines 21 to 263, and the even field includes lines 283 to 525.

When the video signal is read out from the magnetic disc memory 15 shown in FIG. 2, the lines belonging to the even and odd fields, as shown in FIG. 4, are alternately read out, for instance first line 283 in the even field, then line 21 in odd field, then line 284 in the even field and so on. During this reading the magnetic disc memory is rotated at a constant speed, and video signal for the individual lines are produced in the afore-mentioned order from a magnetic head (not shown). The reading of signal in the above order is obtained by on-off controlling the switch circuit 22 with a control signal from the logic circuit 23. The switch circuit 22 couples the even field video signal to the even field 1H memory 24 and the odd field video signal to the odd field 1H memory 26.

FIG. 5 shows the timings of writing in and reading out of the memories 24 and 26. For reading image signal out of the memories 24 and 26 it is necessary to determine the timings of writing and reading by taking the exposure period in the scanner into considerations. While the exposure period in the scanner is determined by the sensitivity of the films set on a scanner drum and the intensity of light, it is longer than is necessary for scanning to produce television signal. Accordingly, it is necessary to read out the video signal over a period of time, which is several times the scanning period. This reading period can be suitably set by setting the frequency division ratio of the frequency divider 18 to an appropriate value. In the instant embodiment, the writing and reading periods are set by setting the frequency division ratio n as shown below. The period W of writing in the memories 24 and 26 is $$W = \frac{1}{30} \times \frac{1}{525} \times n \text{ (seconds)}$$

The maximum period A, which the memories can make use of, is $$A = \frac{1}{30} \times \left( \frac{262.5}{525} + \frac{0.5}{525} \right) \times n \text{ (seconds)}$$

The period R that can be used for reading is $$0 < R < A - W$$

Figure 6:
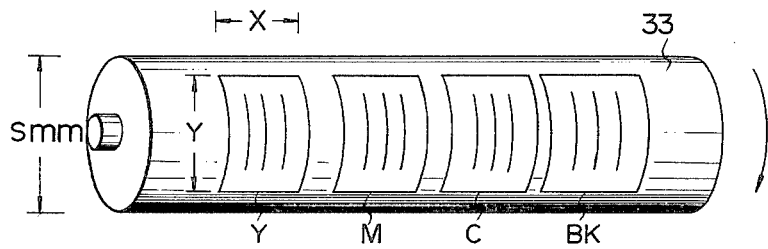
FIG. 6 shows a perspective view of a cylinder of a color scanner.

As shown in FIG. 6, a yellow (Y) plate, a magenta (M) plate, a cyan (C) plate and a black (BK) plate are set in a row on a cylinder 33 of the scanner. In this specification, a "plate" entails a continuous tone negative (or positive) film, a half tone negative (or positive) film and a printing plate. The direction of the 525 horizontal scanning lines corresponds to a direction Y (i.e., direction of rotation). The peripheral length L of the cylinder 33 is $$L = \pi S$$

where S is the diameter of the cylinder. Denoting the longitudinal or horizontal dimension of the finish image of the plates by Y, the period R of reading from the memories 24 and 26 is $$R = (A/L) \times Y \text{ (seconds)}$$

where A is the period required for one rotation of the cylinder of the scanner. The rotational speed of the scanner cylinder, reading period and frequency division ratio are determined in such a manner as to meet the above equation. The writing in and reading out of the memories 24 and 26 are effected according to control signals produced from the write/read control signal generator 27 in a timing which is preset in the above manner. The reading period can be set to a desired value by adjusting the reading period setter 28. The horizontal line signals alternately read out from the memories 24 and 26 in the afore-mentioned timing are supplied to the NTSC decoder 29 for conversion into three primary color signals, that is R, G and B signals, which are in turn converted in the converter 30 into the Y, M, C and BK signals required for printing. The Y, M, C and BK signals are subjected to correction of the gradation, color tone, etc. in the correction circuit 31 and then supplied to the scanner 32. In the scanner 32, the Y, M, C and BK signals are converted into corresponding light intensities for reproduction of the frame as optical images on the Y, M, C and BK plates as shown in FIG. 6.

In case of using for instance, a scanner manufactured by Dainihon Screen Co., Ltd. as a specific example, the frequency division ratio n is suitably n=5. In this case, the rotational speed of the scanner is 12 rotations per second, A is 83.5 msec., W is 317 μsec., and the film exposure period is 41 seconds. With a scanner cylinder diameter of 150 mm and a finish plate image size of 300 mm×400 mm, R is 70.9 msec. and meets the condition $0 < R < A-W$.

As has been shown, according to the invention plates are produced from a television signal by coupling the television signal to a scanner, so that it is possible to produce plates without deteriorating the resolution, gradation and color tone.

Figure 7:
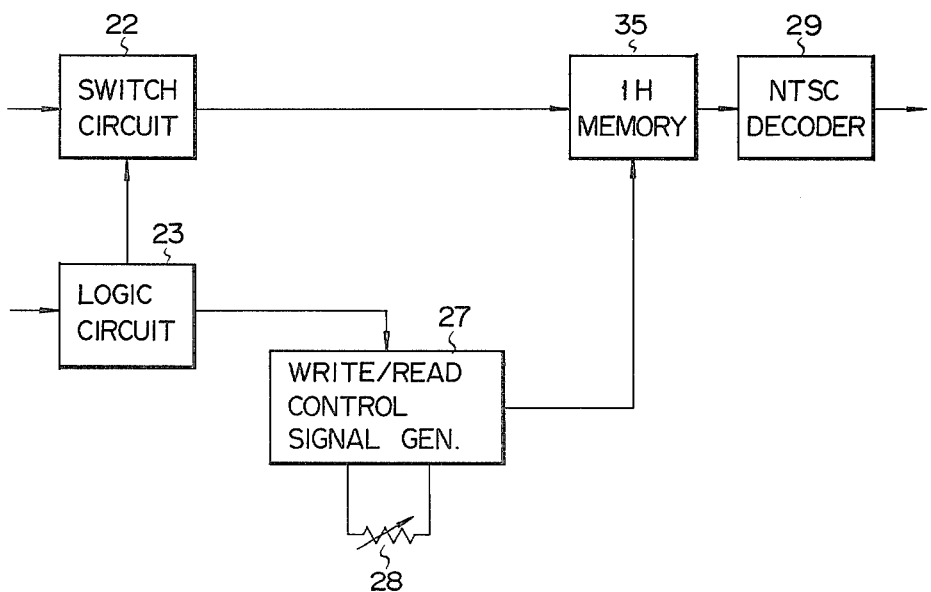
FIG. 7 shows a circuit diagram of a process apparatus according to another embodiment.

While the preceding embodiment uses two memories for the respective fields, it is also possible to use only a single memory as shown in FIG. 7. In this case, the output of the switch circuit 22 is coupled to the single 1H memory 35, the output of which is in turn coupled to the NTSC decoder 29.

Further, while in the preceding embodiment the NTSC decoder is provided after the 1H memories, this position is by no means limitative; for example, the decoder may be provided before the frame memory 15, and in this case the frame memory 15, switch circuits 19 and 22 and 1H memories 24 and 26 may be provided for each of the R, G and B signals.

In the following embodiments, the NTSC decoder is provided after the 1H memories.

The size Y of the finish plate image may be freely adjusted within a range between 0 and (A-W)L/A (mm). The reading period changes with the plate image size, but the rotational speed of the cylinder and exposure period are not changed.

Figure 8A:
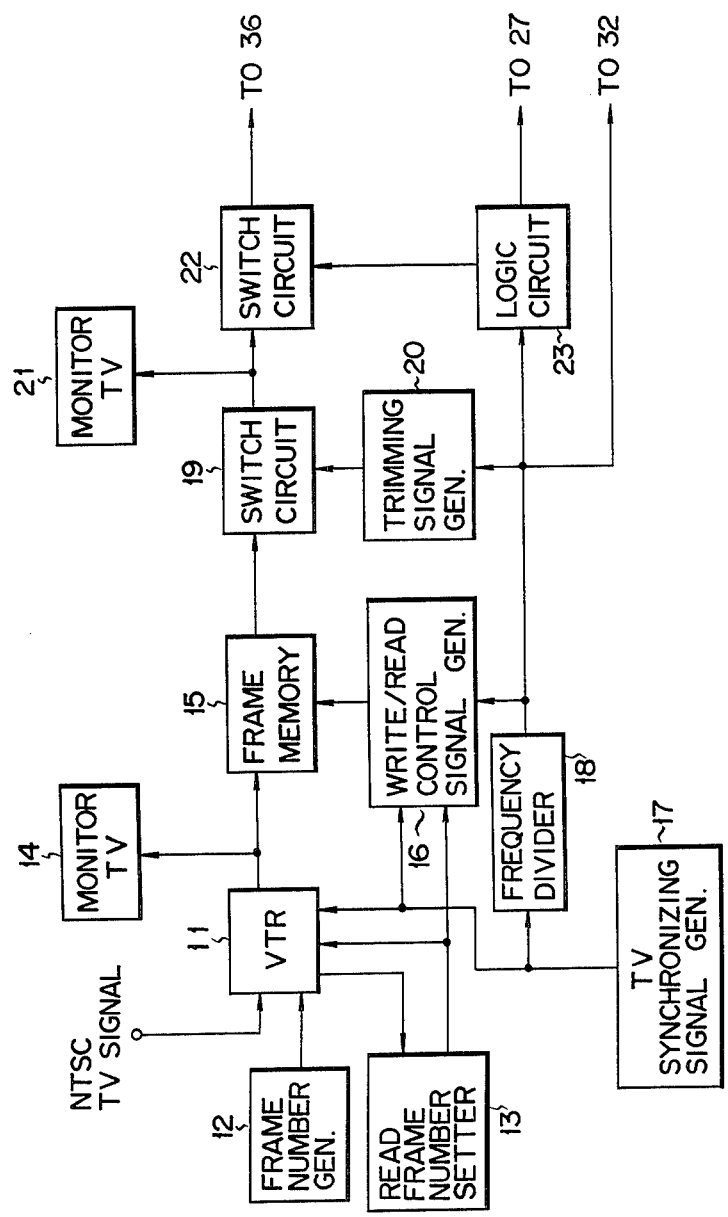
FIGS. 8A and 8B show a circuit diagram of a process apparatus using an intermediate horizontal line according to another embodiment.
Figure 8B:
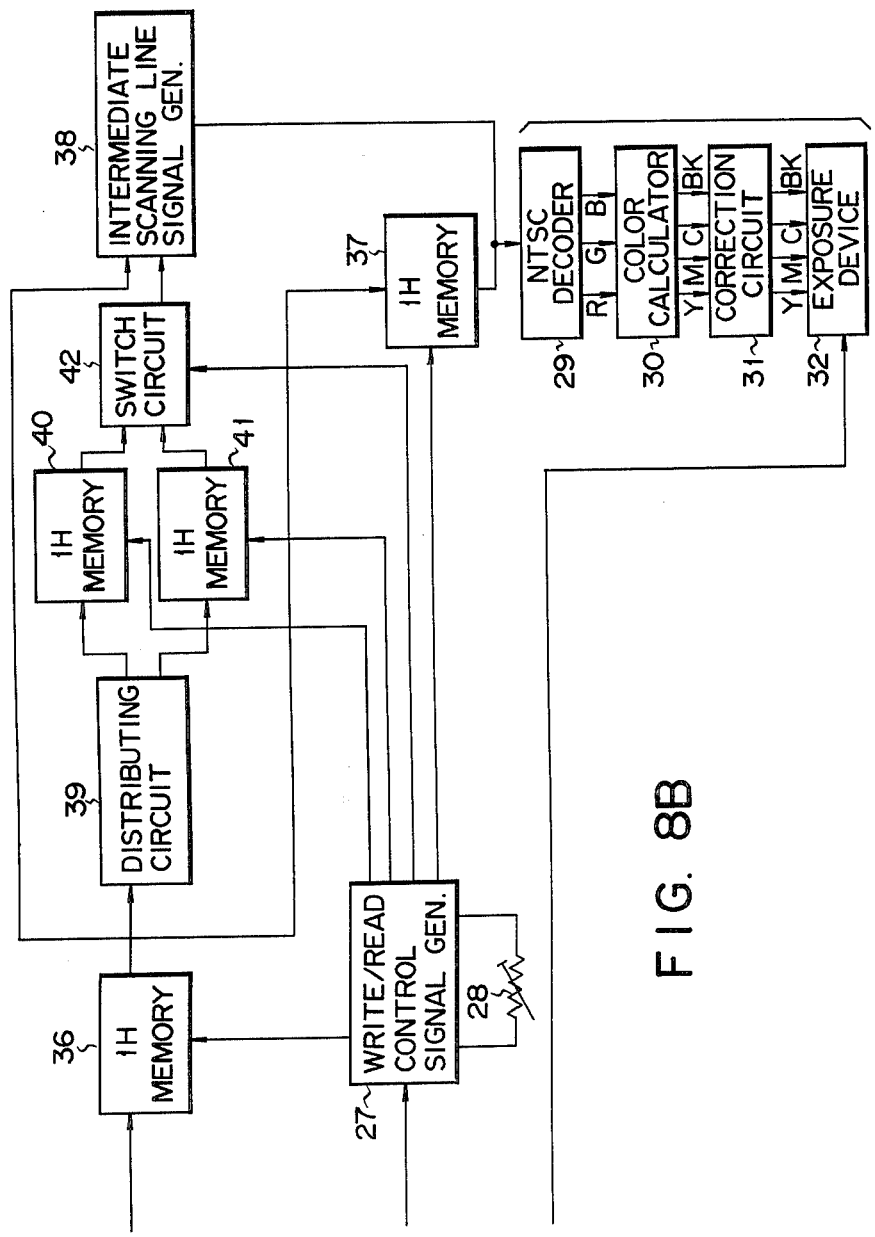

FIGS. 8A and 8B show a second embodiment. In this embodiment, the horizontal line signals of the odd and even fields of one picture frame which are coupled through switch circuit 19 to switch circuit 20 are passed therethrough alternately and in the order of the line numbers according to a control signal from logic circuit 23. The output terminal of the switch circuit 22 is connected to a 1H memory 36. The writing in and reading out of the memory 36 is effected according to a control signal from write/read control signal generator 27. The write/read control signal generator 27 produces a control signal according to the output of the logic circuit 23, and the timing of reading is adjusted by reading period setter 28. One horizontal line signal written in the memory 36 is read out under the control by the control signal generator 27 and coupled to a 1H memory 37, an intermediate line generator 38 and a distributing circuit 39. The line signal coupled to the memory 37 to be written therein is then read out therefrom and coupled to an NTSC decoder 29. The distributing circuit 39, memories 40 and 41, a switch circuit 42 and the intermediate horizontal line signal generator 38 are provided for producing an intermediate virtual horizontal line between two adjacent horizontal lines from these adjacent horizontal lines. The horizontal line signal coupled to the distributing circuit 39 is written in the memories 40 and 41 alternately, in the instant embodiment the horizontal line signal of the odd field in the memory 40 and that of the even field in the memory 41. The horizontal line signals written in the memories 40 and 41 are selected by the switch circuit 42 to be coupled to the intermediate horizontal line signal generator 38. The intermediate horizontal line signal generator 38 synthesizes an intermediate virtual horizontal line from the horizontal line signal from the memory 36 and the horizontal line signal from the switch circuit 42. In the instant embodiment, the intermediate horizontal line signal generator 38 is adapted to produce an average value of the two input line signals.

The output of the intermediate horizontal line signal generator 38 is coupled to the NTSC decoder 29.

The horizontal line signal written in the memory 37 is supplied to the NTSC decoder 29 under the control by the control signal generator 29 in the manner as mentioned earlier. Then, an intermediate horizontal line signal between that horizontal line signal and the next (or adjacent) one, synthesized by the intermediate horizontal line signal generator 38, is supplied to the NTSC decoder 29. Then, the next horizontal line signal memorized in the memory 37 is supplied to the NTSC decoder 29. In this way, horizontal line signals and intermediate horizontal line signals are alternately supplied to the NTSC decoder 29.

That is, line 283, intermediate line between lines 283 and 21, line 21, intermediate line between lines 21 and 284, line 284 and so on are supplied in the mentioned order to the NTSC decoder.

In this case, since the number of horizontal lines inclusive of the number of the intermediate horizontal lines is 1,050, the period R that can be used for reading out signal from the memory 36 is $$0 < R < A/2$$

When a scanner, for instance, manufactured by Dainihon Screen Co., Ltd. is used in this case, the frequency division ratio n is suitably 10.

With the frequency division ratio n=10, the writing period W is $$W = \frac{1}{30} + \frac{1}{525} \times n = 635 \text{ (μsec.)}$$

and since $$A/2 = \frac{1}{30} + \frac{263}{525} \times n \times \frac{1}{2} = 83.5 \text{ (msec.)}$$

the rotational speed of the scanner cylinder is 1/83.5 revolutions per msec., that is, 718.6 rpm. With a cylinder diameter S of 150 mm and a plate size of 300 mm×400 mm, $$L = \pi S = 471.2 \text{ (mm)}$$

and the period R of reading out signal from the 1H memory 36 is $$R = \frac{A}{2L} Y = \frac{83.5 \times 10^{-3}}{471.2} \times 400 = 70.9 \text{ (msec.)}$$

and thus the condition $0 < R < A/2$ is satisfied. The period required for the exposure of the films is about one minute and 20 seconds.

The plate image size of the plates can be freely adjusted within a range, which is determined from the above conditions to be $$0 < Y < L \text{ (mm)}$$

The reading period changes with the plate image size, and it may be adjusted by the reading period setter 28 in FIG. 8B. By so doing, the rotational speed of the cylinder and exposure period are not changed.

As has been shown, according to the second embodiment the number of horizontal lines can be increased in effect when supplying the television signal to the plate-making machine by combining intermediate vertual horizontal lines with 525 horizontal lines of the television signal, thus permitting fine printing. While in the preceding embodiment one intermediate line is provided between adjacent horizontal lines, it is also possible to provide two or more intermediate lines.

Figure 9:
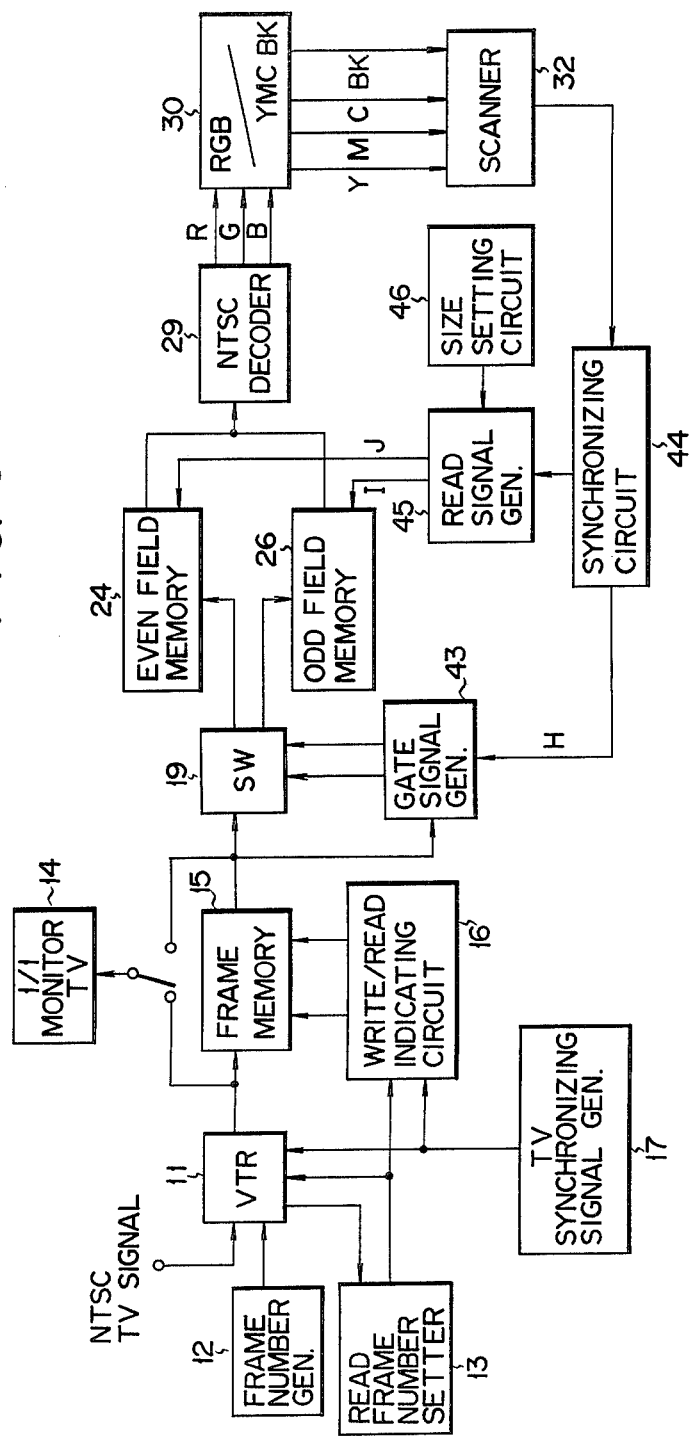
FIG. 9 shows a block diagram of a process apparatus having a commercially available scanner according to another embodiment.

FIG. 9 shows a block diagram of a third embodiment. In this embodiment, Y, M, C and BK signals are supplied to a color scanner, which is a commercially available scanner, for producing Y, M, C and BK plates, and a rotational synchronizing circuit 44 is provided for controlling the reading of signal in synchronism to the rotation of the exposure unit (i.e., scanner 32).

For reading out signal from frame memory 15 switch circuit 19 is on-off controlled by a control signal from a gate signal generating circuit 43. The output of the switch circuit 19 is memorized in even and odd 1H memories 24 and 26.

The synchronizing circuit 44 produces a read control signal H by locking a pulse signal produced from the scanner 32 in synchronism to the rotation of the exposure cylinder. The read control signal H and the reproduced signal from the frame memory 15 are supplied to the gate signal generator 43, which produces a signal for opening the switch circuit 19. The gate signal generator 43 separates the synchronizing signals from the video signal, assigns numbers as shown in FIG. 2 to the video signal and produces a signal for on-off operating the switch circuit 19 in the order of line numbers 283, 21, 284, . . . in synchronism to the reading signal H.

The switch 19 passes the input video signal either to even field 1H memory 24 or odd field 1H memory 26 depending upon whether the signal belongs to the even field or odd field, and the memorized signal is read out according to a read control signal I or J from a read control signal generator 45.

A feature of the preceding embodiment is that a commercially available scanner is used. With a commercially available scanner, films to be exposed are set on a cylinder as shown in FIG. 6 and rotated at a rate of 140 or 200 lines per centimeter for exposure.

With the ordinary scanner, the original side and exposure side are rotated in synchronism to each other, and it is possible to produce plates in enlarged size and contracted size as well as in original size.

With the preceding embodiment, production of plates in the original size and also in enlarged sizes is possible by synchronizing 525 horizontal lines of the television video signal and the rotational speed of the scanner. Since the rotational speed of the commercially available scanner is fixed, that is, the rotational speed of the scanner cannot be controlled to meet the television signal, the rate of reading of the television signal is controlled in accordance with the rotational speed of the scanner and the magnification factor of the plate image size.

With the preceding embodiment the direction of scanning of the 525 horizontal lines of television signal is made to coincide with the direction Y in FIG. 6. Since the television picture frame includes 525 lines while the feed mechanism of the scanner has a fixed rate of 140 or 200 lines per centimeter, the plate image size cannot be freely set.

In case of production plate images through exposure of 525 lines in the scanner, with the magnification set to the original size the concrete dimensions of the plate image in this case, under the assumption that the vertical and horizontal blanking periods are excluded, $X=3.5$ cm and $Y=4.1$ cm at the rate of 140 lines/cm, while $X=2.7$ cm and $Y=3.3$ cm at the rate of 200 lines/cm.

Magnification can be obtained in the following way. A plate image size of magnification factor m, for instance, is obtained through exposure of $525 \times m$ lines in the scanner, that is, each television signal horizontal line is exposed m times in the scanner.

Thus, any integral number can be taken as the magnification factor, and the X dimension of the plate is determined when the magnification factor is set. As for the Y dimension, by setting the magnification factor with a plate size setting circuit 46 shown in FIG. 9 the number of read control pulses (identical with m) and the width thereof are determined.

In case of $m=2$, for instance, the signals written in the memories 24 and 26 may be read out twice, and at the rate of 140 lines/cm the plate size is 7.0 cm by 8.2 cm, the gating period of the switch circuit exclusive of the horizontal blanking period is 52.7 μsec., as the read control signals I and J, $A/m=100$ msec. and $R/m=49.7$ msec., the rotational speed of the scanner is 10 rev./sec., the peripheral length of the cylinder is $L=6.5''=165$ mm, and the exposure period is about 100 seconds.

The preceding embodiment can thus use a commercially available scanner without modification since the reading of signal is controlled in synchronism to the rotation of the scanner.

Figure 10:
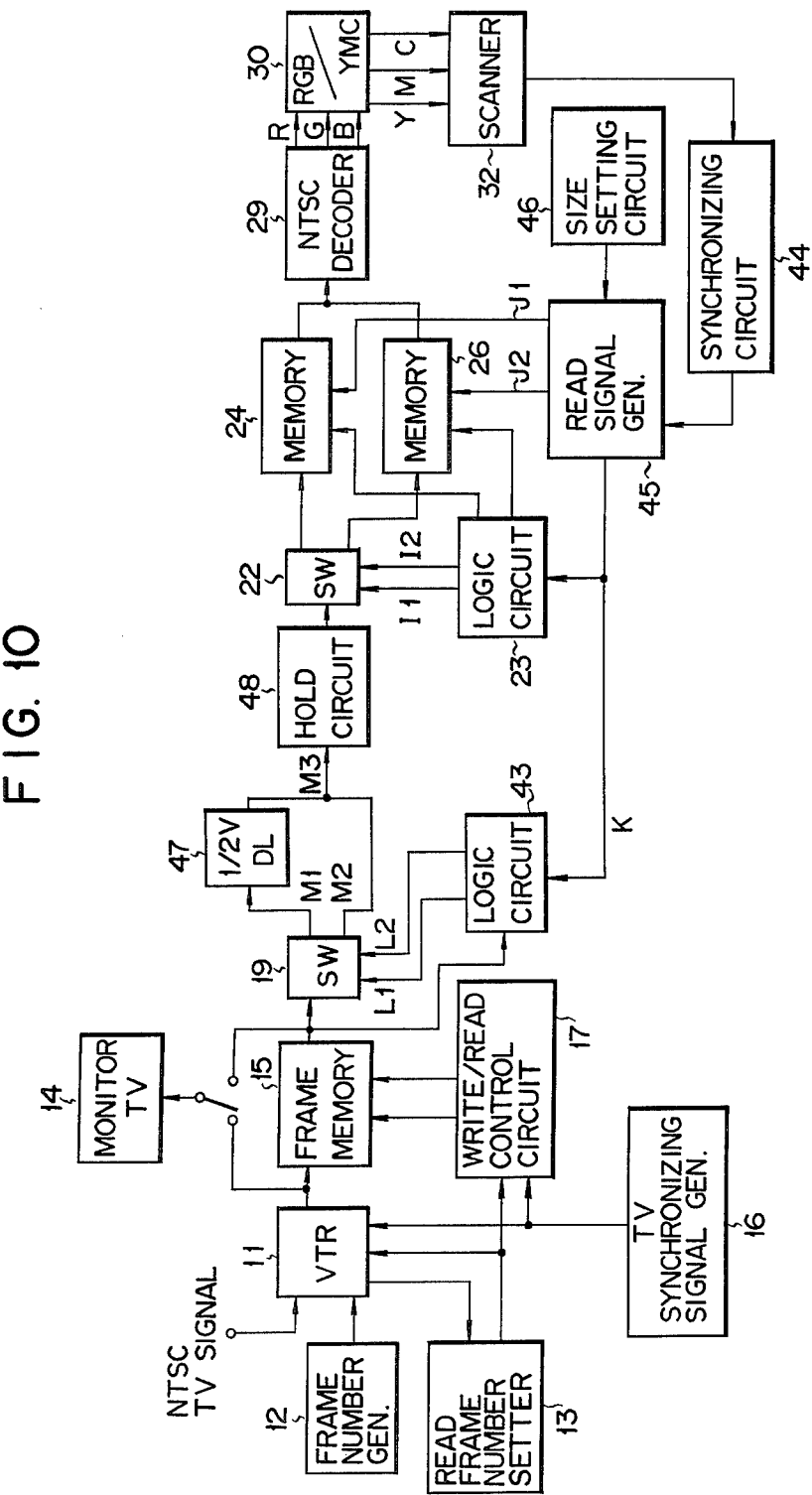
FIG. 10 shows a block diagram of a process apparatus wherein the horizontal lines of a television picture and the exposure scanning lines are made to be in a right angle relation to each other, according to another embodiment.

FIG. 10 shows a fourth embodiment. The read-out (or reproduced) signal from frame memory 15 is coupled to a switch circuit 19 and also to a gate signal generator 43. Coupled to the gate signal generator 43 is a synchronizing signal K, which is synchronized to the rotation of scanner 32 and has a width calculated from the plate image size, and which is produced by a plate image size setting circuit 46, a synchronizing circuit 44 and a read control signal generator 45. In the logic circuit 43 the horizontal and vertical synchronizing signals are separated from the video signal coupled from the frame memory 15, and gate signals $L_1$ and $L_2$ are produced from the separated synchronizing signals and supplied to switch circuit 19 under the control of the synchronizing signal K.

More particularly, the gate signal $L_1$ for a line in the even field such as lines 284, 285, . . . first and then the gate signal $L_2$ for a line in the odd field such as lines 22, 23, . . . are fed to the switch circuit 19 in synchronism to the synchronizing signals of the video and under the control of the synchronizing signal K. FIG. 13 shows the details of the gate signals $L_1$ and $L_2$.

As the television signal the horizontal scanning line of the even field and those of the odd field should be correctly interlaced in the order of lines 21, 284, 22, . . . . The correct arrangement of lines in the order of line numbers 22, 285, 23, 286, 24, . . . can be obtained by delaying the even field lines by $\frac{1}{2}$ V, that is, 1/60 second. Signals $M_1$ and $M_2$ gated by the gate signals $L_1$ and $L_2$ include the video component, and a signal $M_3$ obtained by combining the signals $M_1$ and $M_2$ with the signal $M_1$ delayed by a $\frac{1}{2}$ V delay circuit 47 includes correctly arranged video components.

The video signal $M_3$, however, is an intermittent signal so that it is not suited as an exposure scanning signal which is to be supplied to the scanner 32. Accordingly, it is passed through a holding circuit 48 for converting it into a continuous signal. The continuous signal thus obtained is coupled through the switch circuit 22 to be written in the memory 24 according to a gate signal $I_1$ supplied from gate signal generator 23 and read out from the memory 24 according to a read control signal $J_1$ supplied from the read control signal generator 45 or written in the memory 26 according to a gate signal $I_2$ supplied from the gate signal generator 23 and read out from the memory 26 according to a read control signal $J_2$ supplied from the read control signal generator 45. In this way, the video signal is successively supplied to NTSC decoder 29.

In this embodiment, a commercially available scanner is used, and the direction of the scanning of the horizontal lines of a television picture frame and the direction of the exposure scanning lines in the scanner are made to be in a right angle relation to each other. By adopting the right angle relation between the direction of the television signal horizontal lines and the direction of scanning lines in the scanner (i.e., direction of exposure) it is possible to freely set the plate image size independently of the number of the television signal horizontal lines. Also, by supplying a pulse signal synchronized to the rotation of the cylinder of the commercially available scanner 32 from the scanner to the synchronizing circuit 44 it is possible to simultaneously supply three primary color signals, that is, Y (yellow), M (magenta) and C (cyan) signals, which are synchronized to the scanner.

Figure 11:
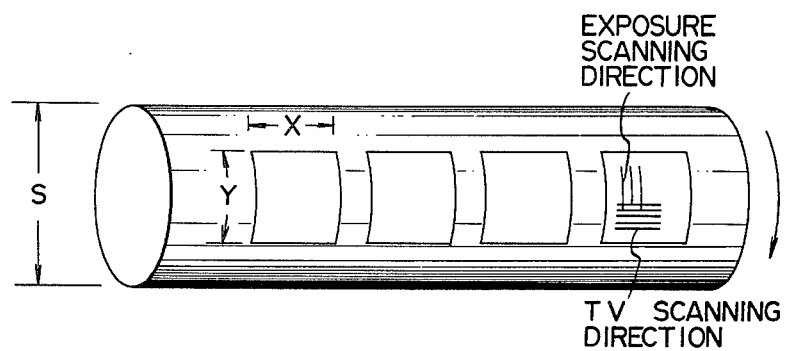
FIG. 11 shows a perspective view of a cylinder of a color scanner used in the embodiment of FIG. 10.

FIG. 11 shows an example of the arrangement of films to be exposed in the exposure section of the scanner 32. As shown in FIG. 11, the direction of scanning for exposure is the same as the direction of rotation of the cylinder, but the direction of scanning of the horizontal lines in the television picture is at right angles to the direction of rotation.

As an example of specific numerical values, the finish plate image size is 3.75 cm $\times$ 5 cm, the rate of scanning of the process scanner is 140 lines/cm, and the rotational speed of the exposure cylinder is 10 rev./sec.

Figure 12:
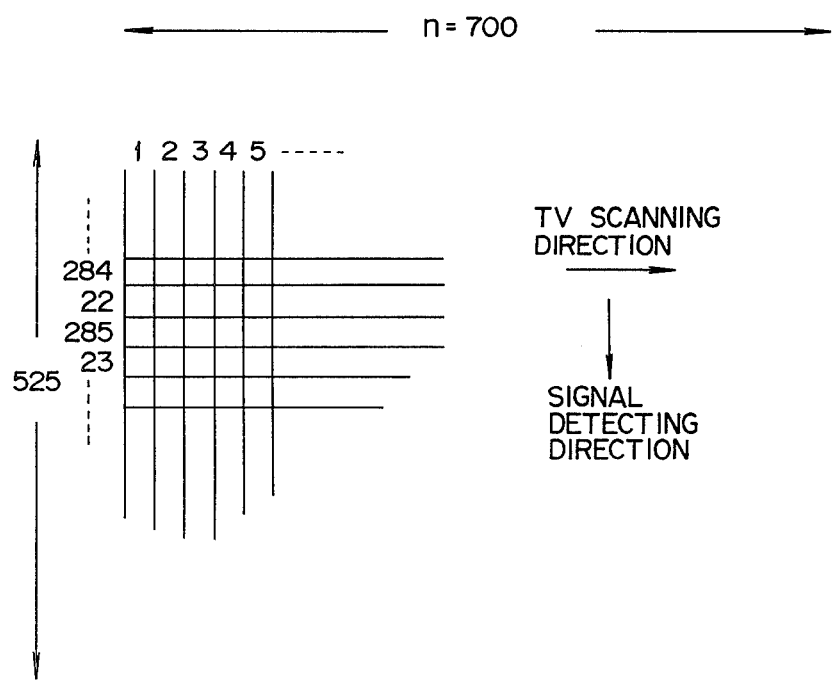
FIG. 12 shows a diagram of the television horizontal lines and exposure scanning lines.

FIG. 12 is a fragmentary enlarged-scale view showing an example of the method of quantizing the television picture. With the scanning over the width of 5 cm at the rate of 140 lines/cm, the number of the exposure scanning lines forming the image is $5 \times 140 = 700$. Thus, one horizontal scanning line is quantized into 700 picture elements. Since the television picture includes 525 horizontal lines, the plate image in this case is formed of a mosaic or array of picture elements in 525 rows and 700 columns.

Since the signal supplied to the color scanner 32 is in the right angle relation to the direction of the horizontal scanning of the television picture the order of signal detection is elements 284, 22, 285, 23, . . . in the first column, elements 284, 22, 285, 23, . . . in the second column, elements 284, 22, 285, 23, . . . in the third column and so on to end in elements 284, 22, 285, 23, . . . in the seven hundredth column.

The reading of signal must be synchronized to the rotation of the cylinder in the scanner 32. A synchronizing pulse is obtained for every 1/10 second from the scanner 32. These pulses constitute the synchronizing signal K. The pulse width is preferably set to 90.7 nsec. to meet the finish printing plate image size. This width corresponds to the case of quantizing one horizontal scanning line of the television picture into 700 elements.

The signal from the frame memory 15 is converted into the signals for making plates in the manner as described earlier.

FIG. 14 shows the relation of individual signals to one another. The relation of the signals $L_1$ and $L_2$ is shown in further detail in FIG. 13.

The video signal $M_3$ is coupled through the switch circuit 22 to be written in the memory 24 according to the gate signal $I_1$ and read out therefrom according to the read control signal $J_1$. The reading rate at this time is determined by the plate image size. This period is y seconds. Since $L=\pi S$ and $l:y=L:Y$ in FIG. 11, $y=l\cdot Y/L$. Accordingly, from $L=7.5$ cm, $Y=3.75$ cm and $l=1/10$ second (10 rev./sec.) is obtained $y=1/20$ second.

With the memories 24 and 26 used for the odd and even rows respectively as shown in FIG. 10, a condition $l-1/60$ second $<y$ can be satisfied within a range $l<y$. In this way pieces of video signal each covering a time interval of y seconds are successively supplied each for a period l to the NTSC decoder 29. This input to the NTSC decoder 29 is converted thereby into the R, G and B signals, which are in turn converted by converter 30 into the Y, M and C signals supplied to the process scanner 32. In this case, the exposure period is 1/10 second multiplied by 700, that is 70 seconds.

Since in this embodiment the direction of the scanning of the horizontal lines of the television picture frame and the direction of the scanning lines in the process scanner (i.e., direction of exposure) are made to be in a right angle relation to each other, it is possible to freely set a desired plate image size without any limitation imposed by the number of the horizontal scanning lines of the television picture frame and determine the value of n in FIG. 12 from the plate image size and the number of scanning lines in the scanner.

Further, since the three video signals for making printing plates, that is, Y, M and C signals, can be simultaneously supplied to a commercially available color scanner in synchronism thereto be merely receiving therefrom a pulse signal synchronized to the rotation of the cylinder of the scanner, the commercially available scanner can be used without any modification.

FIG. 15 shows a fifth embodiment. In this embodiment, a signal of one field is supplied through a switch 22 to a distributing circuit 39, which sorts its input into three signals, i.e. a signal supplied to an A delay circuit 49 delaying signal by A seconds, a signal directly supplied to an OR circuit 50 and a signal supplied through a 2A delay circuit 51 delaying signal by 2A seconds to the OR circuit 50. The signal directly supplied to the OR circuit 50 and the signal supplied to the OR circuit 50 after being delayed by 2A seconds through the 2A delay circuit 51 are combined in the OR circuit 50, and the resultant combination is divided by 2 in an averaging circuit 52. The averaged signal from the averaging circuit 52 dividing the input by 2 and the signal delayed by A seconds through the A delay circuit 49 are combined in an OR circuit 53, the output of which is coupled to a 1H memory 54 and then coupled to NTSC decoder 29.

FIG. 16 shows the relation of these signals. The signal (1) is read out from the frame memory 15, the signal (2) is obtained by delaying the signal (1) read out from the frame memory by A seconds, the signal (3) is obtained by delaying the signal (1) read out from the frame memory by 2A seconds, the averaged signal (4) is obtained from the signal (1) read out from the frame memory and the signal (3) is obtained by delaying the frame memory output by 2A seconds, the signal (5) is obtained by combining the signal (2) obtained by delaying the frame memory output by A seconds and the averaged signal (4) and memorized in the 1H memory, and a signal (6) is obtained by reading out the memorized signal (5).

Referring back to FIG. 15, the signal (1) in FIG. 16 is distributed by the distributing circuit 39, the signal coupled to the A delay circuit 49 is delayed thereby into the signal (2), the signal (1) directly coupled to the OR circuit 50 and the signal (3) having passed through the 2A delay circuit 51 are combined in the OR circuit 50, the output of which is divided by 2 in the averaging circuit 52 into the signal (4), the signal (4) and the signal (2) having passed through the A delay circuit 49 is combined in the OR circuit 53 to produce the signal (5) which is written in the 1H memory 54, and the signal (6) is read out of the 1H memory 54 and supplied to the NTSC decoder 29.

In this way, a signal approximating the video signal of one frame can be obtained from the video signal of one field by the average interpolation method, so that a smooth image can be obtained. As far as regards a picture of one frame consisting of two fields, where it contains moving portions, it blurs at those moving portions. To avoid this, we have to use the abovementioned method.

A sixth embodiment of the invention will now be described in connection with a method of selecting a desired frame for printing from the video signal recorded in the VTR in FIG. 1. To select a desired frame for printing from the video signal recorded on the video tape and accurately specify the selected frame to the printing plate maker is very difficult. Usually, it has been in practice to playback the video tape on a monitor connected to a VTR, stop the tape when a desired picture frame is played back, photograph this frame with a polaroid camera while reading out and recording the count data of the counter of the VTR at the same time and hand the photograph, tape and counter information over to the printing plate maker. The printing plate maker playback the video tape on a VTR, stop the VTR when the specified counter number is reached and select among nearby frames a frame which seems to be most resembling the polaroid camera picture. By this method, the specified picture frame cannot be accurately selected. According to the invention, the frame number generator 12 is used as shown in FIG. 1 to produce frame numbers and record them on the video tape, and also the frame number indicator 13 is used to read out and specify the number of a frame to be printed so that the specified frame may be selected from the video tape and supplied through the VTR 11 to the frame memory 15.

Figure 17:
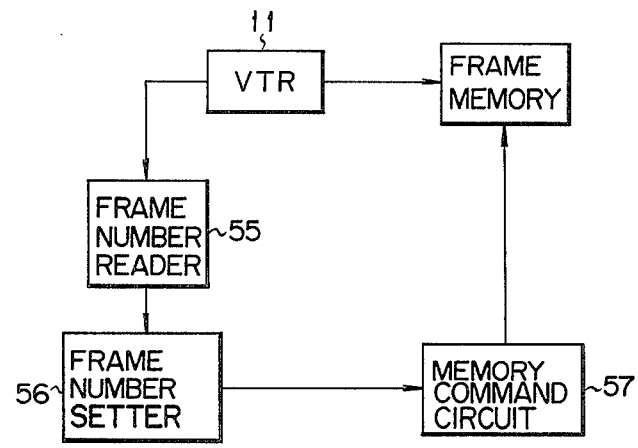
FIG. 17 shows a block diagram of a frame number detecting circuit.
Figure 18:
FIG. 18 shows the output signal of a frame number indicator used in the frame number detecting circuit.

In this case, a time code signal generator for producing signals representing hour, minute, second and frame is used as the frame number indicator 12. For example, SMPTE time code signal generator or VITC (vertical interval time code) signal generator may be used. With the former the signal is inserted in the audio track of the video tape, and with the latter the signal is inserted in the vertical blanking period of the video signal. When recording television signal with the VTR, the time codes are recorded at the same time. At the time of playback, a frame to be printed is determined by a reproduced still picture, and the frame number of that frame is specified to the printing plate maker. The specified frame number is set in the frame number indicator 13 in the form of hour, minute, second and frame. As the video tape is played back on the VTR 11, the time code of the specified frame number is read out by a frame number reader 55 as shown in FIG. 17, and the signal from the reader 55 is supplied to a frame number setter 56. The frame number indicator 56 detects the difference between the frame number signal supplied from the frame number reader 55 and a signal of a specified frame number, and as soon as the difference becomes zero it produces a pulse to actuate a write command circuit 57, whereby the relevant frame is memorized from the VTR 11 in the frame memory 15. The output signal of the frame number setter 56 may be a pulse signal or a step signal as shown in FIG. 18, and the rising of the pulse or step signal may be used as a write command signal.

Figure 19:
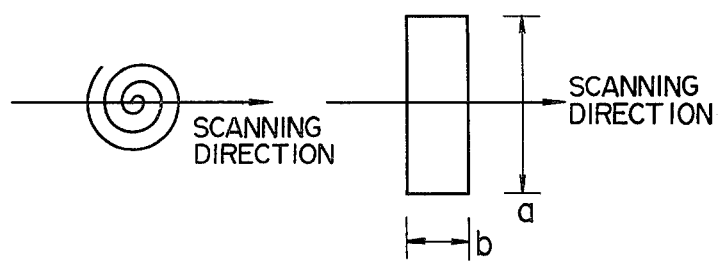
FIG. 19 illustrates the traces of a light spot exposing a process film.

A seventh embodiment of the invention will now be described in connection with the exposure spot in the scanner 32 in FIG. 19. With commercially available color scanners the light spot formed on the film at the time of the exposure is mostly in the form of a dot as shown on the left side of FIG. 19, although with some scanners the light spot has a rectangular form. When the film exposed by the scanner 32 is enlarged, the 525 horizontal scanning lines can be recognized just like 525 lines of reproduced television picture on the picture tube can be seen as such by observing them from a position close to the screen. As the film for making plates, however, it is undesired that the scanning lines are recognizable. The scanning lines may be made unrecognizable by adopting a rectangular form of light spot which is formed on the film at the time of exposure as shown on the right hand of FIG. 19. The dimension a is suitably of a value sufficient to make the scanning lines unrecognizable, preferably 1.5 to 3.5 times the scanning line pitch, and the dimension b is suitably of a value sufficient to maintain the resolution of the television signal (about 5 MHz).

With a scanning density of 500 lines/inch, the plate image size is 27 mm (vertical) by 36 mm (horizontal) which is necessary for realizing one-to-one correspondence between the 525 horizontal scanning lines of the television picture frame and the exposure scanning lines in the color scanner.

In this case, the dimensions of the exposure light spot on the film may, for instance, be a≈150 μm and b≈55 μm.

Where the scanning density is variable, with a density of 100 lines/inch the plate image size is 133 mm (vertical)×178 mm (horizontal), and as the dimensions of the exposure light spot a is 700 to 750 μm and b is 250 to 300 μm.

In the above way, the scanning lines in the plate image can be made unrecognizable without sacrifice in resolution.

A further embodiment of the invention concerns with a method of automatically specifying picture frames to be coupled to the color scanner and will now be described in detail.

Figure 20A:
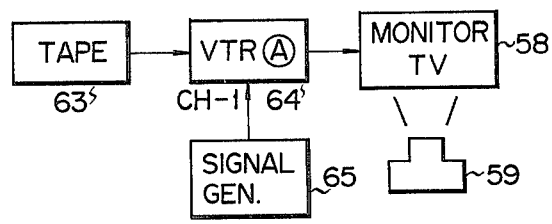
FIGS. 20A to 20C illustrate a method for specifying a picture frame.
Figure 20B:
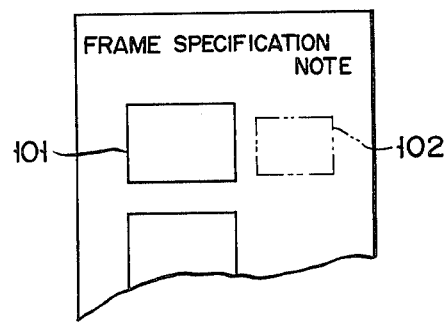
Figure 20C:
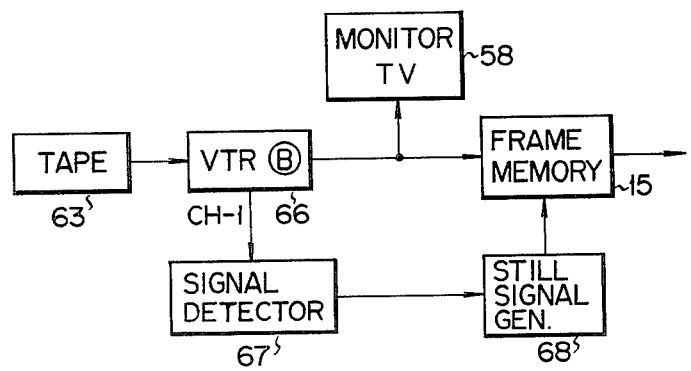

FIGS. 20A to 20C show the system. On the editor side a VTR tape 63, on which a program containing picture frames to be used for platemaking is recorded, is loaded in a VTR (A) 64 as shown in FIG. 22A. This tape 63 need not be what is specially produced. The VTR (A) 64 is a ¾" or 1" set or the like capable of still picture reproduction. The playback picture can be observed on a color monitor television set 58 connected to the VTR (A) 64.

The editor selects frame suited for the printing plates by slow motion playback and still picture reproduction and photographs each selected frame in still picture reproduction with a polaroid camera 59 while also memorizing the number data of the VTR counter. Then the editor arranges the photograph 101 and counter number data 102 to produce a frame specification in a format as shown in FIG. 20B.

In accordance with the invention, prior to switching the still picture reproduction back to motion picture reproduction, a switch for a signal generator 65 is turned "ON" in order to record a signal therefrom in the audio track of the tape in after-recording. With the ¾" U-matic VTR, for instance, the audio signal is recorded in track CH-2 simultaneously with the recording of video, and no signal is recorded in track CH-1.

Figure 21:
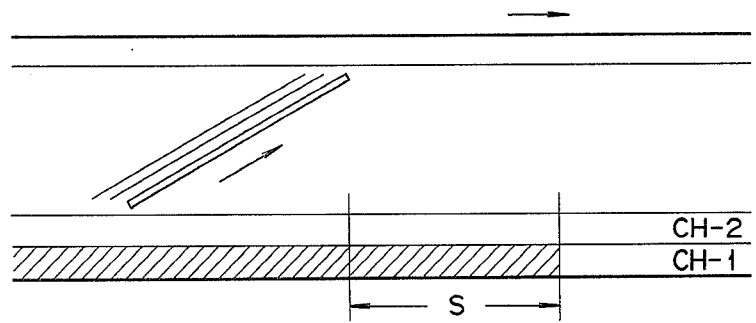
FIG. 21 shows a magnetic video tape.

According to the invention, the signal from the signal generator 65 is recorded by after-recording in the empty track CH-1 as shown in FIG. 21. The VTR tape and frame specification (serving as original) are supplied from the editor to the printing-plate maker or print maker side. On the printing-plate maker side, a VTR (B) 66, a signal detecting circuit 67 connected to the VTR (B) and serving to detect the signal recorded in the audio track CH-1 and a write command signal generator 68 are provided as shown in FIG. 20C. The received tape is played back through the VTR (B) 66 on the monitor television set 58. Before the frame specified by the editor appears, no signal is present in the track CH-1. As soon as the specified frame is reached, the signal which is recorded in the track CH-1 is detected. Upon detection of this signal, the write command signal generator 68 supplies a write command signal to the frame memory 15 for writing one frame of video therein.

It is to be noted that the picture frame that is memorized in the frame memory 15 is the next frame or the playback field delaying from the recording field to the frame specified by the editor. In order to be able to memorize the specified frame itself, therefore, a signal must be present at a position of the track corresponding to the frame immediately preceding the specified frame.

Figure 22:
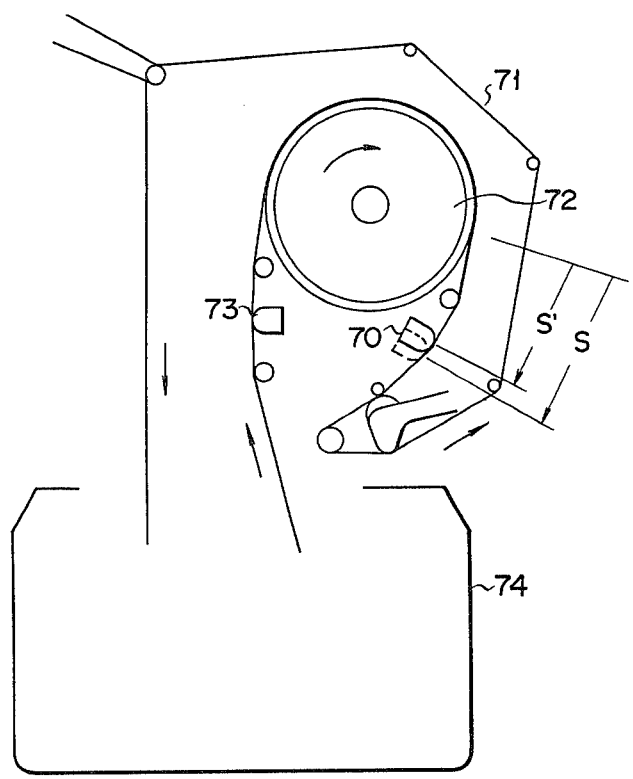
FIG. 22 illustrates a process video tape recorder.

FIG. 22 shows an example, in which a measure for realizing this is provided in the VTR (B) 66 on the printing-plate maker side. More particularly, the position of an audio head 70 is slightly shifted toward the video head side.

Figure 24:
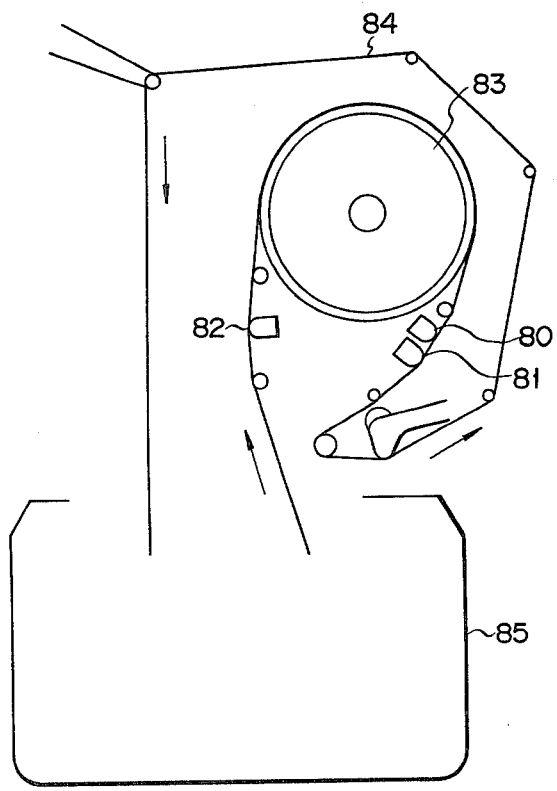
FIG. 24 illustrates a process video tape recorder.

For example, with the ¾" U-matic VTR the running speed of the tape 71 is 95.3 mm/sec., and since the tape travels by 1.59 mm in 1/60 second, the audio head may be shifted such that $$S' = S - 1.59 \text{ mm}$$

as shown in FIG. 24.

Figure 23:
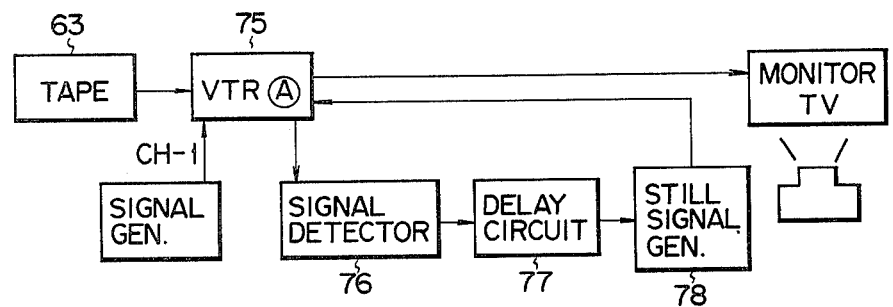
FIG. 23 shows a block diagram of a device for specifying a picture frame.

In FIG. 23, designated at 72 is a guide cylinder, at 73 an erasing head, and at 74 a cassette.

Since one printing-plate maker deals with a number of editors, it is better to modify the VTR (B) 66 on the printing-plate maker side.

Of course, it is possible to shift the audio head of the VTR (A) 60 such that $$S' = S + 1.59 \text{ mm}$$

instead of modifying the VTR (B) 66, and by so doing the same effects can be obtained.

As a further alternative, the pass of the tape 71 may be slightly varied, and in this case again the same effects can be obtained.

The signal generator 65 used in the preceding embodiment is a low frequency oscillator circuit at 1 KHz or so and can thus be inexpensively manufactured. The write command signal generator 68 is an electronic switch for on-off operating the frame memory 15 according to whether the 1-KHz or like low frequency signal from the circuit 68 is present or not, so that it can have a simple circuit construction and be inexpensively manufactured.

Further, the picture frame memorized in the frame memory 15 can be checked for its coincidence with the photograph on the frame specification by playbacking it (i.e., reading it out) from the memory.

The preceding embodiment of FIGS. 20A to 20C which is the basic system for specifying television picture frames, does not include a mechanism for permitting the editor to select again, when required, a frame which has been selected before.

FIG. 23 shows a further embodiment, which incorporates such a mechanism. This embodiment is the same as the preceding embodiment up to the after-recording of signal. FIG. 24 shows the internal construction of an editor side VTR (A') 75 which is employed in this embodiment. The embodiment features a signal detection audio head 80 provided separately of the existing audio head and detecting another signal therebefore in terms of time. This head is provided for detecting the after-recording signal in the track CH-1 in advance. In view of the construction of the VTR it is preferably disposed immediately before the existing audio head 81, or it may be disposed before or after an erasing head 82.

When the editor wants to observe again a picture frame which has been selected before, its still picture reproduction can be obtained through the following flow of signal. As shown in FIG. 23, the after-recording signal recorded in the track CH-1 is detected by the after-recording signal detection audio head 80 and coupled to a signal detecting circuit 76. The detected signal is then delayed for a predetermined time through a delay circuit 77 before it is coupled to a still command signal generator 78, which provides a still command signal to a remote control terminal of the VTR (A') 75.

In the above way, the editor can observe again any desired picture frame which has been selected before.

In FIG. 24, designated at 83 is a guide cylinder, at 84 a tape, and at 85 a cassette.

Since the tape 63 is the same as that in the embodiment of FIGS. 20A to 20C, the same effects as in the embodiment of FIGS. 20A to 20C can be obtained on the printing-plate maker or print maker side.

Figure 25:
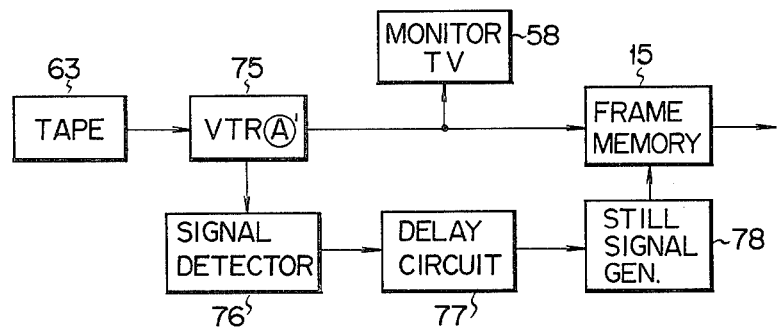
FIG. 25 shows a block diagram of another device for specifying a picture frame.

The same concept as in the preceding embodiment of FIG. 23 may also be adopted on the printing-plate maker and print maker side. FIG. 25 shows an example of such case. Here, a still command signal produced from a still command signal generator 78 is coupled not to the remote control terminal of the VTR (A') 75 but to the frame memory 15. When the after-recording signal detection audio head 80 is disposed 10 mm before the existing audio head 81, the delay period is suitably 88.2 msec. In FIG. 25, designated at 63 is a VTR tape, at 76 an after-recording signal detection circuit, at 77 a delay circuit, and at 58 a color monitor television set.

Figure 26:
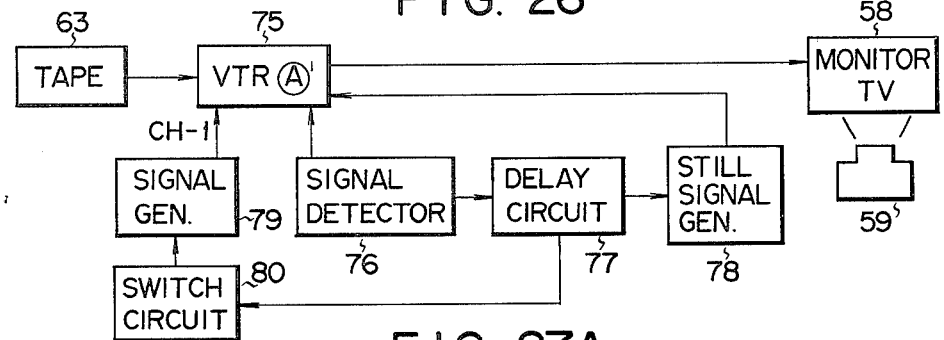
FIG. 26 shows a block diagram of a still another device for specifying a picture frame.

FIG. 26 shows a further embodiment of the invention. In this embodiment, on the editor side the after-recording signal is recorded afresh in the track CH-1 at a position thereof corresponding to the immediately preceding field. In this case, the printing-plate maker or print maker side VTR requires no modification. This embodiment is the same as previous embodiment described in connection with FIGS. 20A to 20C and 23 up to the after-recording of a signal at 1,000 Hz or the like in an empty track such as the track CH-1.

The editor re-winds the VTR tape 63, and then switches the VTR (A') 75 over to motion reproduction while setting a state of after-recording in the track CH-1. If the VTR (A') 75 is a ¾" U-matic VTR, an after-recording signal detection audio head is provided in the manner as shown in FIG. 24.

The after-recording signal in the track CH-1 is detected by the after-recording signal detecting circuit 76 and delayed by the delay circuit 77 to be coupled to a switching circuit 80, which is connected to an after-recording signal generator 79. The signal having been delayed for a predetermined period of time turns "ON" the switching circuit 80, whereupon a signal at 1,000 Hz or so is provided and recorded in the track CH-1. The leading end of the signal recorded afresh is adapted to be located before that of the already recorded signal by an amount corresponding to one field or fields of the number by which the picture at the time of recording is to be played back by being delayed.

With this arrangement, on the printing-plate maker side the specified frame can be memorized without need of any modification of the VTR in FIG. 20C.

This embodiment also permits the editor side to observe again an already selected picture frame as still picture reproduction in the manner as described earlier in connection with FIG. 23. In FIG. 26, designated at 78 is a still command signal generator, at 58 a monitor television set, and at 59 a polaroid camera.

The after-recording signal may have a high frequency above 10 KHz as well. In case where the after-recording is made in superimposition upon signals already recorded in the track CH-1 or CH-2, a frequency, to which the ears of the man is poorly sensitive and also which does not have any adverse effect upon the program reproduction, may be selected.

The track for after-recording is by no means limited to the audio tracks, and the control track, vertical blanking region of the video or cue track may be used as well. When using, for instance, the control track, in which a rectangular wave at 29.97 Hz is recorded, the frequency of the signal to be recorded in superimposition upon that rectangular wave may selected to a frequency capable of being sufficiently separated through a filter.

The after-recording signal may have any desired period so long as it obstruct the specification of the next frame, and the shortest period is 1/60 second.

As has been shown, the system for specifying and selecting frames according to the invention features high reproducibility after the selection of a frame and does not require much time and labor. Further, it requires addition of a simple electric circuit and slight modification of the VTR without adversely affecting the proper function of the process apparatus and is inexpensive.

A further embodiment of the invention will now be described. In the ordinary printing, a color film is supplied as original, and it is set on the scanner to produce yellow (Y), magenta (M), cyan (C) and black (BK) plates.

While the proof is submitted to the customer, it has been in practice to evaluate the finish print by comparing it with the original color film.

In the first embodiment of the apparatus for preparing television picture printing plates mentioned earlier, the Y, M, C and BK plates for printing are produced directly from the television signal. Although the proof impressions of these plates are taken before printing is made, these images can be compared with no original color film for evaluation. Although it may be throught to bring VTR or monitor television set into the printplate maker or print maker, this is inconvenient and awful.

Further, the publishers for ordering prints are not familiar with and uneasy about the VTR tape stuff, the content of which cannot be directly seen. The following embodiment of the invention solves the above problem by producing a color film together with the plates.

Figure 27A:
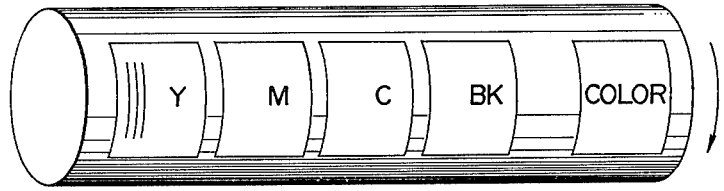
FIGS. 27A and 27B show cylinders of a color scanner, respectively.
Figure 27B:
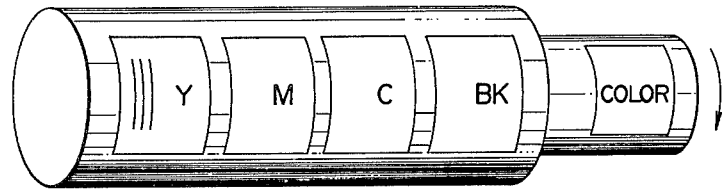

FIGS. 27A ad 27B show examples of the arrangement of films to be exposed on the exposure cylinder of the apparatus according to the invention. In the example of FIG. 27A, a color film of the same size as the plates is produced, and in the example of FIG. 27B a color film of a size smaller than that of the plates is produced.

Figure 28:
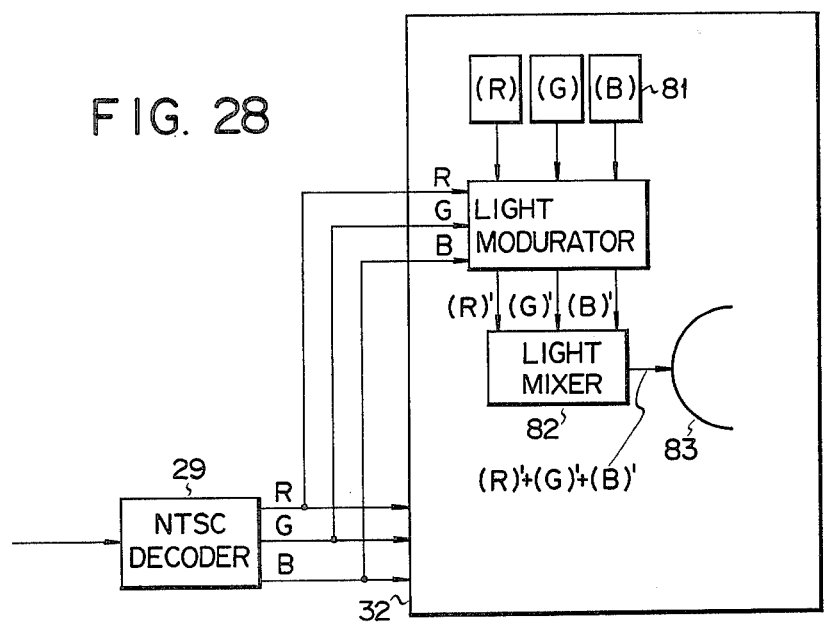
FIG. 28 shows a block diagram of a color exposure device.

FIG. 28 shows a color film exposure section of this embodiment of the apparatus.

The three primary color signals, that is, R, G and B signals, produced from NTSC decoder 29 are coupled through color correction circuit in the scanner 32 for conversion into the four printing color signals which are in turn supplied to a cylinder exposure section. According to the invention, the R, G and B signals are also coupled to a color film exposure section. Since laser sources can now be readily handled, an example of using laser for light sources 81 will be described.

He-Ne gas laser of 6,328 Å is suitably used as the source of red light (R), Ar gas laser of 5,145 Å as the source of green light (G), and He-Cd gas laser of 4,416 Å as the source of blue light (B). These laser beams (R), (G) and (B) are modulated by the respective electric signals R, G and B, and the resultant modulations (R)', (G)' and (B)' are synthesized in a light synthesizer 82 into a single laser beam. The light synthesizer 82 comprises mirrors. The resultant modulated beam (R)'+(G)'+(B)' is projected onto a film 83 to effect color film exposure.

Figure 29:
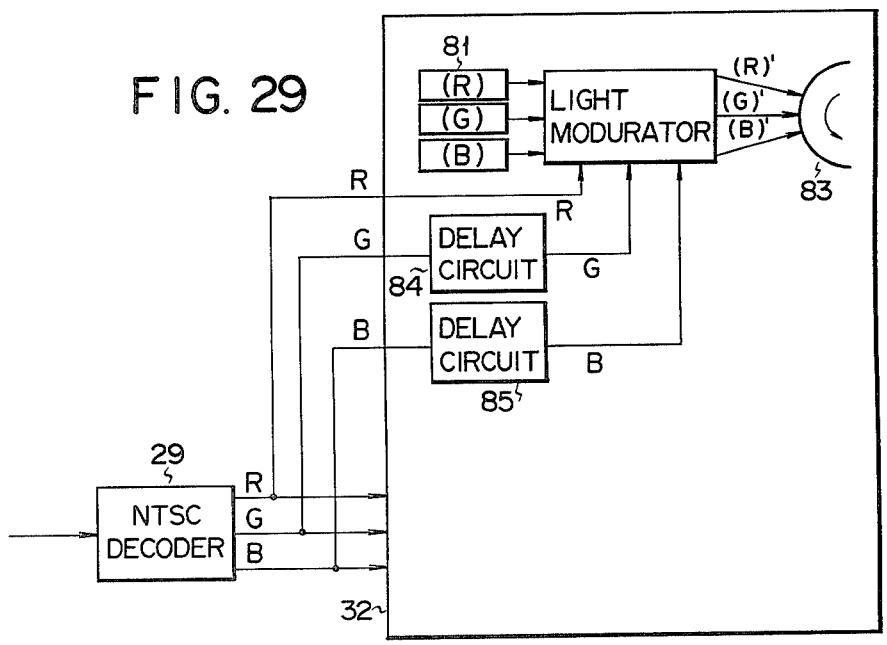
FIG. 29 shows a block diagram of another color exposure device.

FIG. 29 shows another example of the color film exposure section. In this example, the three exposure laser beams are not combined but are directly projected. The light sources have a definite size, and they are arranged in a column in the instant example. In this example, delay circuits 84 and 85 are provided for the respective G and B signals so that the three signals can be synchronized on the film 83.

The light sources 81 may be arranged in a row as well.

Further, conventional tungsten lamps or xenon lamps may also be used as the light sources 81. In such cases, the necessary colors can be obtained by using suitable filters. For example, Latten filters No. 29 (R), No. 61 (G) and No. 47 (B) (trade names) by Kodack may be used. In this case, the source voltage may be modulated with the R, G and B signals to obtain the modulations (R)', (G)' and (B)' for exposure.

While in the foregoing description the NTSC decoder 29 has been placed immediately before the process scanner 32, this is done so for the purpose of facilitating the understanding of the description. This position, however, is by no means limitative, and the NTSC decoder 29 may also be placed before or after the frame memory 15. In such cases, three sets of the component parts, respectively for the R, G and B signals, have to be provided between the NTSC decoder 20 and process scanner 32.

Since the preceding embodiment has the construction as described above, a color film can be produced together with the Y, M, C and BK plates directly from the television signal so that it is possible to confirm the quality of the finish print picture and also evaluate the proof by comparison with the color film.

What we claim is:

1. An electronic process apparatus comprising:
video tape reproducing means for reading a video tape containing a recording of a video television signal and an audio signal code identifying the area of the audio track which corresponds to a video frame recorded next subsequent to a predetermined frame signal of the recorded television signal and for detecting the frame specifying signal during the reading of the television signal, including a video head and an audio head, said video head positioned a predetermined distance from said audio head corresponding to the time required for a tape to be moved to reproduce one video frame so that said audio head traces that area of the audio track which corresponds to the video frame preceding the video frame that is being traced by said video head;
memory means connected to said reproducing means for storing a video frame signal being reproduced when said frame specifying audio signal is detected;
scanner means including a cylinder for supporting a plurality of monochromatic films for color separation processing, a plurality of exposure heads for exposing said films in accordance with said stored video frame signal, and a driving section for causing said cylinder to be rotated about its axis to cause said exposure heads to move relative to said films and along the axis of said cylinder a predetermined distance in synchronism with the rotation of said cylinder whereby said exposure heads scan said films with the circumferential direction of said cylinder as the main scanning direction; and
a signal processing circuit means connected to said memory means and said scanner means for (1) causing respective horizontal scanning line component signals of said stored frame component signal to be read a plurality of times from said memory means in a noninterlaced relation for each rotation of said cylinder and over a time corresponding to the size of said film, (2) converting the readout video frame signal into a plurality of color component signals for color separation processing and (3) supplying said color component signals to said exposure heads.

2. An electronic process apparatus according to claim 1, in which an exposure light spot on the original film coming from said exposure head has a rectangular configuration with a shorter side thereof in a main scanning direction and a longer side thereof in a sub-scanning direction orthogonal to the main scanning direction.

3. An electronic process apparatus according to claim 1, wherein a color film is attached to the surface of said cylinder, comprising:
a color image producing means in said scanning means for exposing said color film in accordance with an electrical signal supplied to produce a color image, said driving section including means for moving said color image producing means predetermined amounts along the axial direction of said cylinder in synchronism with the rotation of said cylinder to scan said color film, means included in said signal processing circuit for causing a horizontal scanning line component signal for color photographs and for supplying said color component signal to said color image producing means.

4. An apparatus for preparing color separation films from a color television signal comprising;
(A) means for reproducing a recording medium on which is recorded a color television signal including a picture signal, which represents a desired picture frame and comprises a plurality of scanning (horizontal) line signals;
(B) signal generating means having a frame memory and a decoder, for converting the picture signal into three primary color scanning (horizontal) line signals and for generating the hree primary color scanning (horizontal) line signals;
(C) write signal generating means for generating a write signal to store said picture signal from said television signal in said frame memory of said signal generating means;
(D) means for setting a size of a color separation film;
(E) a scanner for making color separation films;
(F) read signal generating means connected to said scanner for generating a read signal to read out the three primary color scanning line signals from said signal generating means in synchronism with the rotation of said scanner;
(G) means for increasing the number of scanning lines of the three primary color signals generated from said signal generating means to more than the number of scanning lines of the color television signal according to a size set by said size setting means; and
(H) means for converting the three primary color scanning line signals read out from said signal line number increasing means into color processing signals of yellow, magenta and cyan, for calculating a black signal and for supplying the yellow, magenta, cyan and black signals to said scanner.

5. The process apparatus according to claim 4, further comprising:
a memory for storing scanning line signals read out one after another from said frame memory;
an intermediate scanning (horizontal) line signal generating means for producing a signal corresponding to a virtual intermediate scanning (horizontal) line between adjacent horizontal line signals as a function of said read signal; and
means for alternately reading out the individual scanning lines and intermediate scanning lines in right order and in synchronism with the scanning speed of the color scanner.

6. The process apparatus according to claim 4, further comprising:
a memory for storing horizontal line signals constituting two field read out from said frame memory in two divisions, one for the even field and the other for the odd field; and
means for alternately reading out the even field horizontal lines and odd field horizontal lines in synchronism with the scanning speed of the color scanner.

7. The process apparatus according to claim 6, wherein the direction of scanning in the scanner is a right angle to the direction of the horizontal scanning of the television signal.

8. The process apparatus according to claim 4, comprising means for producing interpolated horizontal line signals including means for reading out horizontal line signals in one field from said frame memory and producing there from horizontal line signals in the other field through average value interpolation in synchronism with the scanning speed of the color scanner.

9. The process apparatus according to claim 4, further comprising:
a frame number signal generator for producing a frame number signal to be recorded on a video tape;
a frame number setter for storing a predetermined frame number signal coupled thereto;
a frame number reader for (1) reading out a time code representing a frame number from the video tape, (2) comparing the readout frame number with said predetermined frame number to detect a difference between the frame numbers and (3) producing a pulse when such difference becomes zero; and
a memorization command circuit including means for causing said frame memory to store the frame of said predetermined frame number in response to said pulse.

10. The process apparatus according to claim 4, comprising means for forming the light spots on films exposed in said scanner in vertically elongate rectangular shapes.

11. The process apparatus according to claim 4, in which said scanner further exposes a color film to a color image obtained from the video signal concurrently with the exposure of yellow, magenta, cyan and black plates for printing.

12. An apparatus according to claim 4, further comprising:
a frame-specifier including a first video tape recorder for recording a specifying signal on an audio track of a video tape on which a color television signal representing the frame specified by said frame-specifier is recorded, said reproducing means includes a plate maker and a second video tape recorder to be used by said plate maker to detect the specifying signal from said video tape and supply the television signal representing the specified frame to said signal generating means in accordance with the detected specifying signal.

13. An apparatus according to claim 12, wherein said second video tape recorder has an audio head shifted toward a video head relative to said first video tape recorder for detecting the specifying signal and selecting the specified frame before it is received at said video head.

14. An apparatus according to claim 12, in which said first video tape recorder includes a specifying signal detection audio head for confirming the specified frame with said first video tape recorder in a still picture reproduction state based on detection of a specifying signal by said specifying signal detection audio head.

15. An apparatus according to claim 12, in which said second video tape recorder includes a specifying signal detection audio head for obtaining a specified frame for plate making, with said second video tape recorder in a still picture reproduction state, based on detection of a specifying signal by said specifying signal detection audio head.

16. An apparatus according to claim 12, in which said first video tape recorder includes a specifying signal detection audio head for detecting a specifying signal and for recording a new specifying signal in accordance with the detection of said specifying signal.

17. An apparatus according to claim 4, in which said scanner comprises means for exposing color separation films along a plurality of scanning lines with a predetermined pitch and said size setting means includes means for designating the number of scanning lines necessary for exposing a color separation film.

18. An apparatus according to claim 17, in which said scanning line number increasing means comprises an interpolation means connected between said signal generating means and said means for converting primary color scanning line signals, said interpolation means including means for interpolating according to the number designated by said size setting means to create a scanning line signal between two successive scanning line signals read out from said signal generating means.

19. An apparatus according to claim 17, in which said scanning line number increasing means comprises means for controlling said read signal generating means so that the same scanning line signal is repeatedly supplied to said scanner during a specific number of rotations of said scanner, which number is based on the number designated by said size setting means.

20. A method of specifying television picture frames, which is used with an apparatus for preparing a color separation film from a color television signal comprising; a means for reproducing a recording medium on which is recorded a color television signal including a picture signal, which represents a desired picture frame and has a plurality of scanning lines; signal generating means having a frame memory and a decoder, for converting the picture signal into three primary color signals (red, green and blue) and for generating the three primary color signals; write signal generating means for generating a write signal to store the picture signal from recording medium in the frame memory of said signal generating means; a scanner for making color separation films; a read signal generating means for generating a read signal to read out the three primary color signals from said signal generating means in synchronism with said scanner; means for increasing the number of scanning lines of the three primary color signals generated from said signal generating means to more than the number of scanning lines of the color television signal according to an output size of said scanner; and means for converting the three primary color signals read out from said signal generating means into processing color signals of yellow, magenta and cyan, for calculating a black signal and for supplying the yellow, magenta, cyan and black signals to said scanner, including the steps of:

recording a signal for specifying a television picture frame in an audio track of a video tape on the specifier side;

reading said audio track; and utilizing said signal for selecting a specified frame on the plate maker side.

* * * * *